United States Patent
Wu

(10) Patent No.: US 8,744,654 B2
(45) Date of Patent: Jun. 3, 2014

(54) METHOD OF CONTROLLING HYBRID WORKING MACHINE AND METHOD OF CONTROLLING PUMP OUTPUT OF HYBRID WORKING MACHINE

(75) Inventor: Chunnan Wu, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 418 days.

(21) Appl. No.: 13/130,816

(22) PCT Filed: Nov. 25, 2009

(86) PCT No.: PCT/JP2009/069833
§ 371 (c)(1),
(2), (4) Date: May 24, 2011

(87) PCT Pub. No.: WO2010/061837
PCT Pub. Date: Jun. 3, 2010

(65) Prior Publication Data
US 2011/0238264 A1    Sep. 29, 2011

(30) Foreign Application Priority Data

Nov. 28, 2008  (JP) ................. 2008-304530
Dec. 3, 2008   (JP) ................. 2008-308698

(51) Int. Cl.
*G06F 7/00*    (2006.01)

(52) U.S. Cl.
USPC .................... 701/22; 701/50; 180/65.22

(58) Field of Classification Search
USPC ......... 701/22, 36, 50; 180/65.22, 65.25, 65.3, 180/65.4
See application file for complete search history.

(56) References Cited

U.S. PATENT DOCUMENTS

| 7,637,333 | B2 * | 12/2009 | Grundl et al. | 180/65.22 |
| 7,900,724 | B2 * | 3/2011 | Promersberger et al. | 180/53.4 |
| 2003/0205422 | A1 * | 11/2003 | Morrow et al. | 180/65.2 |

FOREIGN PATENT DOCUMENTS

| JP | 10-103112 | 4/1998 |
| JP | 2004-011256 | 1/2004 |
| JP | 2005-012902 | 1/2005 |

OTHER PUBLICATIONS

International Search Report mailed on Mar. 9, 2010.

* cited by examiner

*Primary Examiner* — Richard Camby
(74) *Attorney, Agent, or Firm* — IPUSA, PLLC

(57) ABSTRACT

A method of controlling a hybrid working machine having a hydraulic pump driven with the output of an engine and the output of a motor generator includes calculating the input side power of the hydraulic pump and controlling the output of the motor generator based on the calculated power.

16 Claims, 20 Drawing Sheets

| | PUMP SWASH PLATE ANGLE | | | | | | | |
|---|---|---|---|---|---|---|---|---|
| | K1 | ... | Kj(2) | Ki | Kj+1(2) | ... | Kn |
| P1 | η1,1 | | η1,j | η1,i | η1,j+1 | ... | η1,n |
| ... | . . . | | . . . | . . . | . . . | | . . . |
| Pj(1) | ηj,1 | | ηj,j(3) | ηj,i | η1,j+1(3) | | ηj1,n |
| Pi | ηi,1 | | ηi,j(4) | ηo(5) | ηi,j+1(4) | | ηi1,n |
| Pj+1(1) | ηj+1,1 | | ηj+1,j(3) | ηj+1,i | ηj+1,j+1(3) | | ηj+1,n |
| ... | . . . | | . . . | . . . | . . . | | . . . |
| Pn | ηn,1 | | ηn,j | ηn,i | ηn,j+1 | | ηn,n |

PUMP DISCHARGE PRESSURE $P1 < P2 < Pj \leq Pi \leq Pj+1 < Pm$ $K1 < K2 < Kj \leq Ki \leq Kj+1 < Kn$

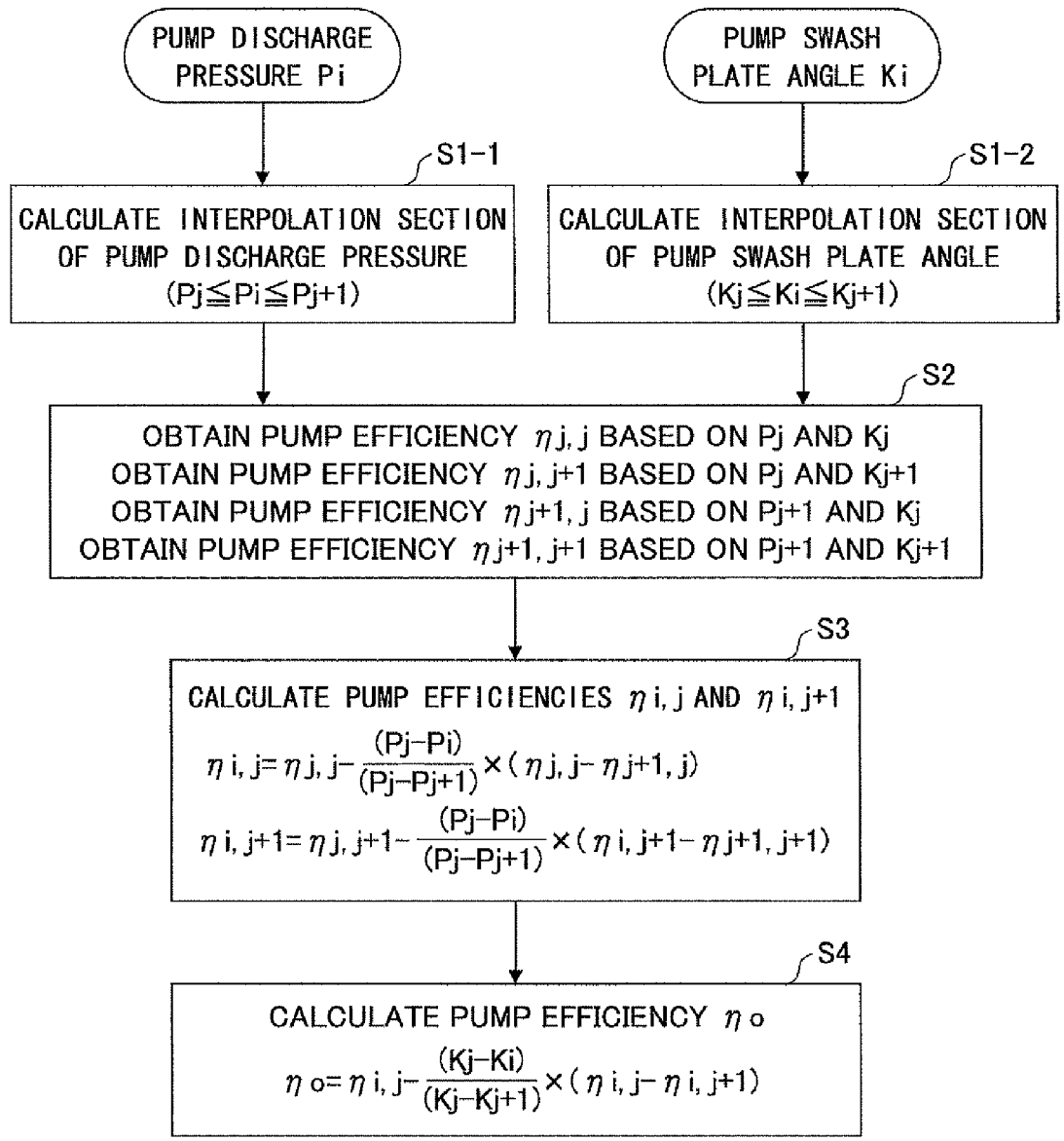

PUMP DISCHARGE PRESSURE Pi

PUMP SWASH PLATE ANGLE Ki

S1-1 CALCULATE INTERPOLATION SECTION OF PUMP DISCHARGE PRESSURE ($P_j \leq P_i \leq P_{j+1}$)

S1-2 CALCULATE INTERPOLATION SECTION OF PUMP SWASH PLATE ANGLE ($K_j \leq K_i \leq K_{j+1}$)

S2
OBTAIN PUMP EFFICIENCY $\eta j,j$ BASED ON $P_j$ AND $K_j$
OBTAIN PUMP EFFICIENCY $\eta j,j+1$ BASED ON $P_j$ AND $K_{j+1}$
OBTAIN PUMP EFFICIENCY $\eta j+1,j$ BASED ON $P_{j+1}$ AND $K_j$
OBTAIN PUMP EFFICIENCY $\eta j+1,j+1$ BASED ON $P_{j+1}$ AND $K_{j+1}$ S3
CALCULATE PUMP EFFICIENCIES $\eta i,j$ AND $\eta i,j+1$ $$\eta i,j = \eta j,j - \frac{(P_j - P_i)}{(P_j - P_{j+1})} \times (\eta j,j - \eta j+1,j)$$

$$\eta i,j+1 = \eta j,j+1 - \frac{(P_j - P_i)}{(P_j - P_{j+1})} \times (\eta i,j+1 - \eta j+1,j+1)$$

S4
CALCULATE PUMP EFFICIENCY $\eta o$ $$\eta o = \eta i,j - \frac{(K_j - K_i)}{(K_j - K_{j+1})} \times (\eta i,j - \eta i,j+1)$$

FIG.16

|  |  | PUMP DISCHARGE PRESSURE P | | | | |
|---|---|---|---|---|---|---|
|  |  | $P_1$ | ... | $P_i$ | ... | $P_n$ |
| PUMP CURRENT I | $I_1$ | $T_{11}$ |  | $T_{1i}$ |  | $T_{1n}$ |
|  | ... | ... |  | ... |  | ... |
|  | $I_i$ | $T_{i1}$ |  | $T_{ii}$ (1) |  | $T_{in}$ |
|  | ... | ... |  | ... |  | ... |
|  | $I_j$ (4) | $T_{j1}$ |  | $T_{ji}$ (3) |  | $T_{jn}$ |
|  | $I_o$ (5) |  |  | $T_o$ (2) |  |  |
|  | $I_{j+1}$ (4) | $T_{j+1,1}$ |  | $T_{j+1,i}$ (3) |  | $T_{j+1,n}$ |
|  | ... | ... |  | ... |  | ... |
|  | $I_m$ | $T_{m1}$ |  | $T_{mi}$ |  | $T_{mn}$ |

$\Delta T_r$ $P_1 > P_2 > P_i > P_n$ $I_1 > I_2 > I_i > I_j > I_{j+1} > I_m$

FIG.19

|  | PUMP DISCHARGE PRESSURE P | | | | |
|---|---|---|---|---|---|
|  |  | $P_1$ | ... | $P_i$ | ... | $P_n$ |
| PUMP CURRENT I | $I_1$ | $Q_{11}$ |  | $Q_{1i}$ |  | $Q_{1n}$ |
|  | ... | ... |  | ... |  | ... |
|  | $I_i$ | $Q_{i1}$ |  | $Q_{ii}$ (1) |  | $Q_{in}$ |
|  | ... | ... |  | ... |  | ... |
|  | $I_j$ (4) | $Q_{j1}$ |  | $Q_{ji}$ (3) |  | $Q_{jn}$ |
|  | $I_o$ (5) |  |  | $Q_o$ (2) |  |  |
|  | $I_{j+1}$ (4) | $Q_{j+1,1}$ |  | $Q_{j+1,i}$ (3) |  | $Q_{j+1,n}$ |
|  | ... | ... |  | ... |  | ... |
|  | $I_m$ | $Q_{m1}$ |  | $Q_{mi}$ |  | $Q_{mn}$ |

$\Delta Q_r$ spans between (1) and (2).

$P_1 > P_2 > P_i > P_n$ $I_1 > I_2 > I_i > I_j > I_{j+1} > I_m$

METHOD OF CONTROLLING HYBRID WORKING MACHINE AND METHOD OF CONTROLLING PUMP OUTPUT OF HYBRID WORKING MACHINE

TECHNICAL FIELD

The present invention relates to methods of controlling a hybrid working machine and methods of controlling the pump output of the hybrid working machine, and more particularly to a method of controlling a hybrid working machine that generates hydraulic pressure by assisting an internal combustion engine with an electric motor to drive a pump and a method of controlling the pump output of the hybrid working machine.

BACKGROUND ART

Common hybrid working machines drive a hydraulic pump with the output of an engine (internal combustion engine) and do work with the generated hydraulic pressure. The engine is assisted with an electric motor to be driven with efficiency. The electric motor is driven mainly with electric power from a battery. The battery is allowed to be charged and discharged. In the case of assisting the engine, the battery is discharged to supply electric power to the electric motor. On the other hand, in the case of not assisting the engine, the battery is charged with electric power from a generator driven by the engine or regenerated electric power from a hydraulic load. Thereby, it is made possible to assist the electric motor by keeping the battery constantly charged to a certain level.

Thus, in hybrid working machines, it is possible to assist the engine with the electric motor. Therefore, the maximum output of the engine is reduced so that the engine may be reduced in size. If an output greater than the maximum output of the engine is required of the hydraulic pump, the request is met by assisting the engine with the electric motor.

By using a motor generator for the electric motor, the electric motor function and the generator function may be combined into one. In this case, it is necessary to control whether to execute the assist function as an electric motor or to execute the power generating function as a generator.

Therefore, it has been proposed to determine the output of the hydraulic pump by operations and to perform switching control over whether to cause a motor generator to operate as an electric motor or to operate as a generator by comparing the determined hydraulic pump output with a threshold. (See, for example, Patent Document 1.)

Further, in hybrid working machines, a variable displacement hydraulic pump is often used in order to allow a generated hydraulic pressure to vary in accordance with a hydraulic load's request. (See, for example, Patent Document 2.)

PRIOR ART DOCUMENTS

Patent Document

[Patent Document 1] Japanese Laid-Open Patent Application No. 2004-11256
[Patent Document 2] Japanese Laid-Open Patent Application No. 10-103112

SUMMARY OF THE INVENTION

Problems to be Solved by the Invention

The output of the hydraulic pump may be determined based on the pressure and the flow rate of the hydraulic pump. This output corresponds to the output side power of the hydraulic pump. Accordingly, conventionally, the output side power of the hydraulic pump is determined by operations, and the output of the motor generator is controlled based on this power.

However, the input side power actually input to the hydraulic pump is not completely equal to the output side power. Therefore, the knowledge of the output side power of the hydraulic pump does not result in precise understanding of the input side power. The input side power of the hydraulic pump is the sum of the power of the engine and the power of the motor generator. The output side power of the hydraulic pump does not precisely reflect the sum of the load of the engine and the load of the motor generator.

For efficient driving of the engine, it is necessary to determine the load of the engine with accuracy and to control the output of the motor generator based on this. Accordingly, for efficient driving of the engine, it is necessary to determine the input side power of the hydraulic pump with accuracy.

Further, in hybrid working machines as described above, the battery is kept charged to a certain level to be ready to drive the electric motor. However, in such a case where a hydraulic load continuously requests a high hydraulic pressure, the amount of charge of the battery may become insufficient so that it may not be possible to assist the engine with the electric motor. In such a case, the output requested of the engine by the hydraulic pump exceeds the maximum output of the engine, so that the engine becomes overloaded. As a result, not only is the engine reduced in operational efficiency, but also the engine may be stalled to stop in the worst case.

An embodiment of the present invention has an object of precisely determining the input side power of a hydraulic pump and controlling the load of an engine based on the input side power. Further, another embodiment of the present invention has an object of providing a method of controlling the pump output of a hybrid working machine which method reduces the output requested of the engine to allow the engine to continue a normal operation by controlling the output of the hydraulic pump when an output exceeding the maximum output of the engine is requested.

Means for Solving the Problems

In order to achieve the above-described objects, according to one embodiment of the present invention, a method of controlling a hybrid working machine having a hydraulic pump driven with an output of an engine and an output of a motor generator is provided that includes calculating an input side power of the hydraulic pump, and controlling the output of the motor generator based on the calculated power.

Further, according to another embodiment of the present invention, a method of controlling a pump output of a hybrid working machine having a variable displacement hydraulic pump driven with an engine and having the engine assisted with a motor generator is provided that includes controlling an output of the variable displacement hydraulic pump in accordance with a predetermined algorithm using an excess of the output of the variable displacement hydraulic pump determined by subtracting an output of the engine and an output of the motor generator from the output of the variable displacement hydraulic pump.

Effects of the Invention

According to one embodiment of the present invention, it is possible to determine the input side power of a hydraulic pump with good accuracy, and the amount of assisting the engine by a motor generator is controlled based on this input side power. Therefore, it is possible to control the load of the engine with good accuracy, so that it is possible to always maintain the engine in a state of good operational efficiency.

Further, according to another embodiment of the present invention, when an output exceeding the maximum output of the engine is requested, it is possible to reduce the output requested of the engine to allow the engine to continue a normal operation by controlling the output of the hydraulic pump.

BRIEF DESCRIPTION OF THE DRAWINGS

FIG. 5 is a diagram illustrating a hydraulic pump efficiency map.

FIG. 6 is a flowchart of operations in the case of determining pump efficiency by interpolation using the pump efficiency map illustrated in FIG. 5.

FIG. 16 is a diagram illustrating the P-T map table, in which parts corresponding to the steps of the process of FIG. 15 are indicated.

FIG. 19 is a diagram illustrating the P-Q map table, in which parts corresponding to the steps of the process of FIG. 18 are indicated.

DESCRIPTION OF EMBODIMENTS

A description is given, with reference to drawings, of an embodiment of the present invention.

Figure 1:
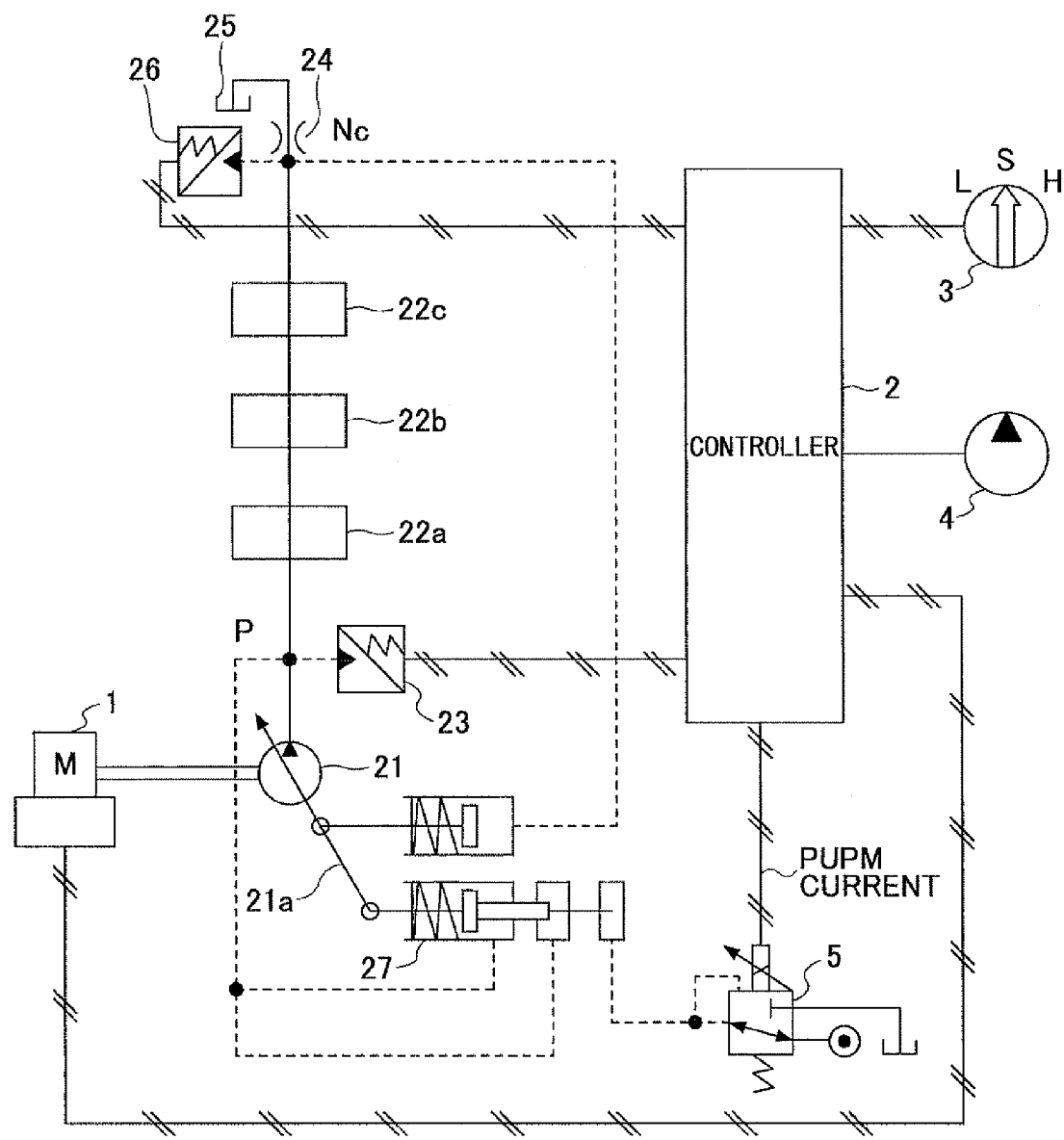
FIG. 1 is a control circuit of a hydraulic shovel applied to the present invention.

First, a description is given of a controller of a hydraulic shovel, which is a hybrid working machine to which an output control method according to the present invention is applied. FIG. 1 is a block diagram illustrating a control circuit of the hydraulic shovel to which the control method according to the present invention is applied. The hybrid working machine to which the present invention is applied is not limited to the hydraulic shovel.

First, a description is given of a configuration of the control circuit of the hydraulic shovel illustrated in FIG. 1. Directional control valves 22a, 22b, and 22c are connected to the oil passage of a variable displacement hydraulic pump (hereinafter simply referred to as "hydraulic pump") 21 driven by an engine motor 1. A pump discharge pressure sensor 23 is connected to the oil passage on the upstream side of the directional control valve 22a. The pump discharge pressure sensor 23 detects the discharge pressure of the hydraulic pump 21. Further, on the downstream side of the directional control valve 22c, the oil passage is connected to a tank 25 via a negative control metering valve (hereinafter, referred to as "nega-con metering valve") 24.

The variable displacement hydraulic pump 21 is, for example, a variable swash plate type hydraulic pump, and the pump output may be varied by varying the angle of a swash plate. That is, it is possible to vary the output of the hydraulic pump 21 by controlling the angle of the swash plate by varying a control current to the hydraulic pump 21.

A negative control sensor (hereinafter, "nega-con sensor") 26 is connected to the nega-con metering valve 24 on its upstream side. The nega-con sensor 26 is connected to a controller 2, and detects the hydraulic pressures of respective hydraulic pressure passages to the tank 25 to input the signals of the detected pressures to the controller 2.

A negative controller (hereinafter referred to as "nega con") composed of the nega-con metering valve 24, the nega-con sensor 26, and the controller 2 is a control system for reducing the loss of the flow rate of the discharge of the hydraulic pump 21 returning to the tank 25.

A mode selector 3 for switching to respective operation modes such as a heavy excavation mode (H mode), a standard excavation mode (S mode), and a finishing excavation mode (L mode) and a throttle volume 4 for setting the engine speed are connected to the controller 2. Further, an electromagnetic proportional valve 5 and a discharge pressure sensor 23 are connected to the controller 2. Further, the electromagnetic proportional valve 5 is connected to a regulator 27, and the regulator 27 controls the discharge flow rate of the hydraulic pump 21.

Figure 2:
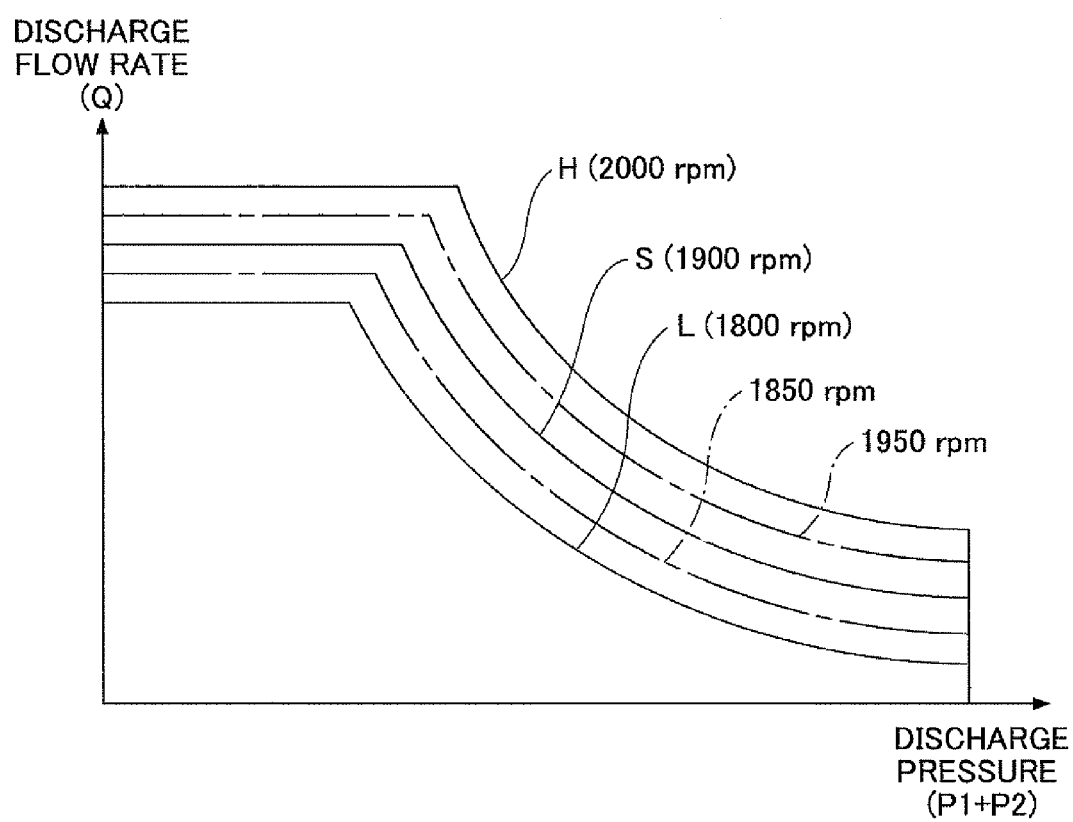
FIG. 2 is a characteristic diagram illustrating the relationship between the discharge pressure and discharge flow rate of a hydraulic pump achieved by the control circuit of FIG. 1.

Usually, the hydraulic shovel is equipped with a switching mechanism for switching to respective modes such as a heavy excavation mode (H mode), a standard excavation mode (S mode), and a finishing excavation mode (L mode). That is, switching to respective operation modes is suitably performed by the controller 2 varying a pump current I through a switching operation of the mode selector 3. With such a switching mechanism of the control circuit, the tilting angle of a swash plate 21a is caused to vary in accordance with the varied pump current I by the regulator 27, thereby controlling the discharge flow rate of the hydraulic pump 21. Further, the input horsepower of the hydraulic pump 21 is caused to vary by the electromagnetic proportional valve 5, and the rotational speed of the engine motor 1 is caused to vary by the controller 2, so that switching among the above-described respective operation modes is performed, thereby achieving the discharge pressure-discharge flow rate characteristic (P-Q characteristic) of the hydraulic pump as illustrated in FIG. 2.

Then, the pump discharge quantity is controlled with the nega-con sensor 26, and further, a variation in a pump discharge pressure P is detected with the pump discharge pressure sensor 23, thereby controlling the quantity of discharge of the hydraulic pump 21.

Figure 3:
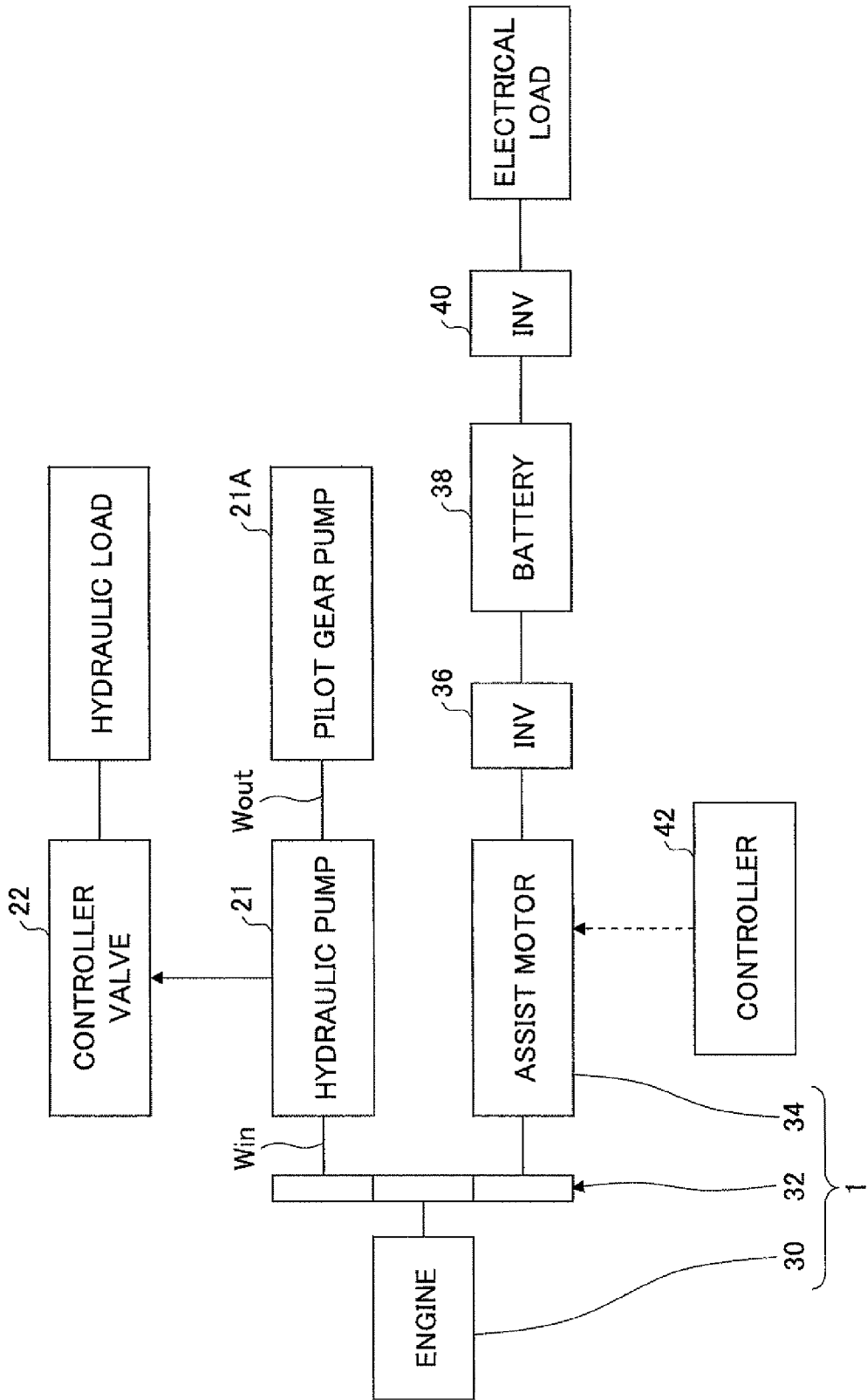
FIG. 3 is a block diagram of a drive system of the hydraulic shovel provided with a controller illustrated in FIG. 1.

FIG. 3 is a block diagram of the drive system of the hydraulic shovel in which the controller illustrated in FIG. 1 is provided. An engine 30 composed of an internal combustion engine and an assist motor 34 composed of a motor generator are connected to a splitter 32, which is a power distributor. The engine 30, the assist motor 34, and the splitter 32 compose the engine motor 1 illustrated in FIG. 1. The variable displacement hydraulic pump 21 is connected to the splitter 32 to be driven with the output of the splitter 32 to discharge high-pressure hydraulic fluid.

The hydraulic fluid discharged from the hydraulic pump 21 is sent to a controller valve 22 composed of the directional control valves 22a, 22b, and 22c illustrated in FIG. 1 to be supplied from the controller valve 22 to a hydraulic load including hydraulic cylinders and hydraulic motors. A pilot gear pump 21A for detecting and controlling hydraulic output is connected to the hydraulic pump 21. The shaft output side output (power) Wout of the hydraulic pump 21 may be determined based on the pressure P and the discharge flow rate Q detected by this pilot gear pump 21A.

The assist motor 34 is connected via an inverter (INV) 36 to a battery 38, which is a charge storage device. The assist motor 34 is driven with the electric power supplied from the battery 38 to operate as an electric motor to assist the engine 30. Further, the assist motor 34 receives engine power via the splitter 32 to operate as a generator to charge the battery 38. An electrical load including an electric motor and an electric actuator is connected to the battery 38 via an inverter (INV) 40 to operate with the electric power supplied from the battery 38.

In the system illustrated in FIG. 3, the operations of the engine 30, the assist motor 34, and the hydraulic pump 21 are controlled by a controller 42. In particular, the controller 42 precisely calculates an output (power) Win on the shaft input side of the hydraulic pump 21 and controls the output (the amount of assisting) of the assist motor 34. Thereby, the controller 42 maintains the output of the engine 30 constantly at an appropriate value and performs such control as to prevent an abnormal operation of the engine and to cause the engine to be driven within a range of good efficiency.

Figure 4:
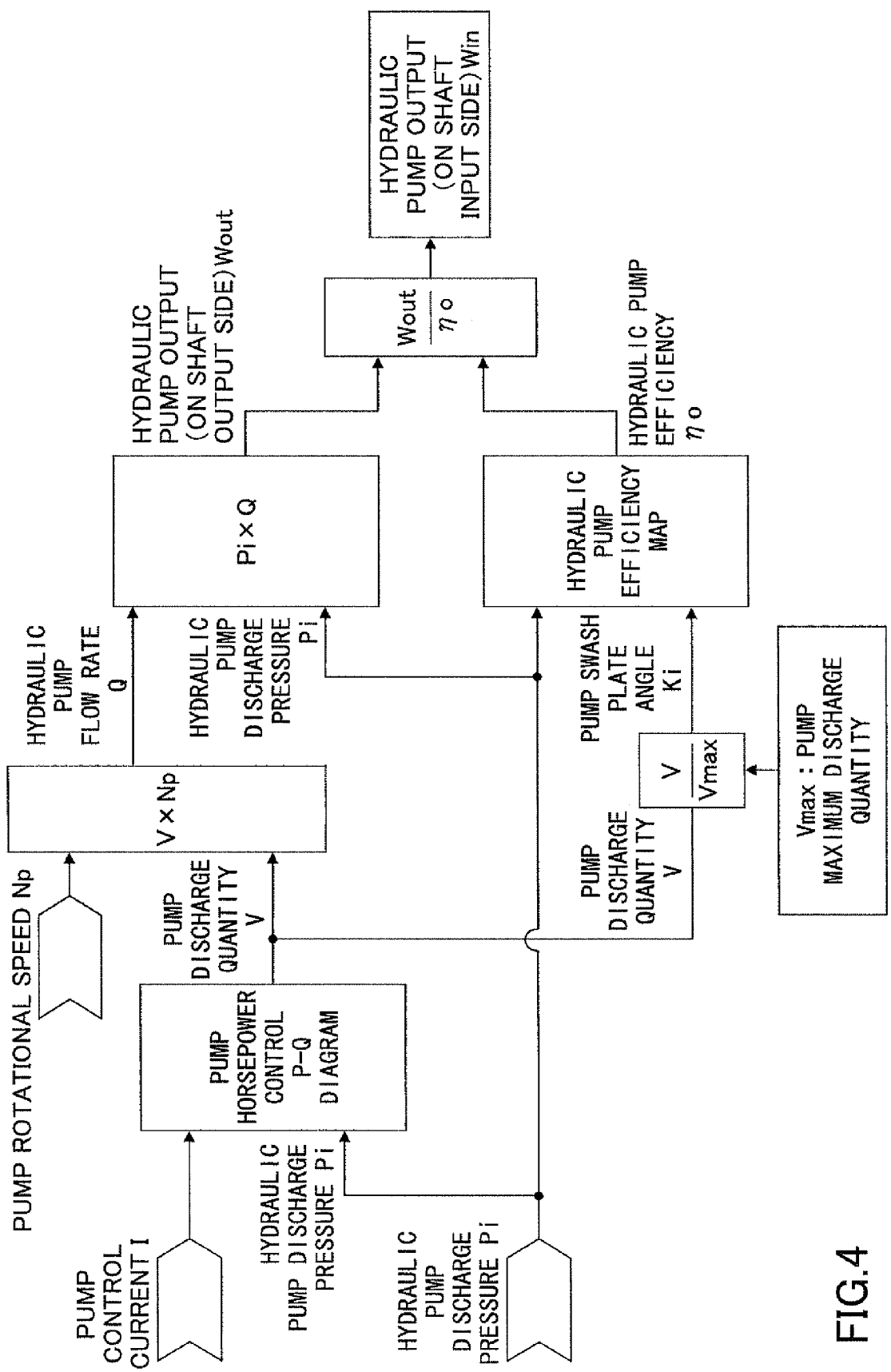
FIG. 4 is a diagram illustrating a hydraulic load calculation algorithm.

Here, a description is given, with reference to FIG. 4, of an algorithm used when the controller 42 calculates the shaft input side output (power) Win of the hydraulic pump 21.

The hydraulic load corresponds to the hydraulic pump output (on the shaft output side) Wout, and is calculated as the product of a discharge pressure Pi and the discharge flow rate Q of the hydraulic pump 21 (Wout=Pi×Q). A value actually measured with the hydraulic sensor is used as the discharge pressure Pi. The discharge flow rate Q is calculated by multiplying a pump discharge quantity V by a pump rotational speed (rpm) Np. The pump discharge quantity V may be determined from the discharge pressure Pi and a control current I supplied to the hydraulic pump 21 based on a P-Q diagram illustrating the discharge pressure-discharge quantity characteristic of the hydraulic pump 21.

As described above, first, the pump discharge quantity V is determined from the pump horsepower control P-Q diagram using the discharge pressure Pi of the hydraulic pump 21 and the pump control current I, and the hydraulic pump flow rate Q is calculated by multiplying the determined pump discharge quantity V by the pump rotation speed (rpm) Np. Then, the hydraulic pump output (on the shaft output side) Wout is calculated by multiplying the calculated hydraulic pump flow rate Q by the discharge pressure Pi.

Next, the hydraulic pump output (on the shaft input side) Win is calculated by dividing the hydraulic pump output (on the shaft output side) Wout by a hydraulic pump efficiency ηo. By taking the hydraulic pump efficiency ηo into consideration, it is possible to determine the hydraulic pump output (on the shaft input side) Win with accuracy. The hydraulic pump efficiency ηo, which is subject to variation depending on the discharge pressure Pi of the hydraulic pump 21 and a swash plate angle Ki, may be a fixed value as an average within a variation range. However, in order to calculate the hydraulic pump output (on the shaft input side) Win with higher accuracy, it is preferable to calculate the hydraulic pump efficiency ηo based on the discharge pressure Pi of the hydraulic pump 21 and the swash plate angle Ki and to calculate the hydraulic pump output (on the shaft input side) Win by dividing the hydraulic pump output (on the shaft output side) Wout by the calculated value.

The hydraulic pump efficiency ηo may be determined based on a hydraulic pump efficiency map using the discharge pressure Pi and the swash plate angle Ki. The swash plate angle Ki is calculated by dividing the pump discharge quantity V determined from the above-described P-Q diagram by a pump maximum discharge quantity Vmax. That is, the hydraulic pump efficiency ηo may be determined with good accuracy based on the hydraulic pump efficiency map using the calculated pump discharge quantity V and the discharge pressure Pi.

The hydraulic pump efficiency map is created in advance by determining efficiency by driving the hydraulic pump while varying the discharge pressure and the swash plate angle. FIG. 5 is a diagram illustrating a hydraulic pump efficiency map. In the case illustrated in FIG. 5, the values of pump efficiency in the case of causing the discharge pressure to vary from P1 to Pn on a vertical axis and causing the pump swash plate angle to vary from K1 to Kn on a horizontal axis are converted into a table. For example, if the pump swash plate angle is Kj and the pump discharge pressure is Pj, the intersection point η(j,j) of the column of the pump swash plate angle Kj and the row of the pump discharge pressure Pj is determined as pump efficiency.

If the values of the pump discharge pressure and the pump swash plate angle are not tabled, the pump efficiency may be calculated and determined by interpolation. FIG. 6 is a flowchart of operations in the case of determining pump efficiency by interpolation using the pump efficiency map illustrated in FIG. 5. In the process illustrated in FIG. 6, the pump efficiency ηo in the case where the pump discharge pressure is a value Pi between Pj and Pj+1 and the pump swash plate angle is a value Ki between Kj and Kj+1 is determined by linear interpolation.

First, in step S1-1, the discharge pressures Pj and Pj+1 before and after the pump discharge pressure Pi are determined. This corresponds to (1) of the pump efficiency map of FIG. 5. It is between the discharge pressures Pj and Pj+1 that is the interpolation section related to the discharge pressure. Likewise, in step S1-2, the swash plate angles Kj and Kj+1 before and after the pump swash plate angle Ki are determined. This corresponds to (2) of the pump efficiency map of FIG. 5. It is between the swash plate angles Kj and Kj+1 that is the interpolation section related to the swash plate angle.

Next, in step S2, the pump efficiency η(j,j) based on the discharge pressure Pj and the swash plate angle Kj is obtained, a pump efficiency η(j,j+1) based on the discharge pressure Pj and the swash plate angle Kj+1 is obtained, a pump efficiency η(j+1,j) based on the discharge pressure Pj+1 and the swash plate angle Kj is obtained, and a pump efficiency η(j+1,j+1) based on the discharge pressure Pj+1 and the swash plate angle Kj+1 is obtained. This corresponds to (3) of the pump efficiency map of FIG. 5.

Next, in step S3, using the obtained pump efficiencies κ(j,j), η(j,j+1), η(j+1,j), and η(j+1,j+1), pump efficiencies η(i,j) and η(i,j+1) are calculated by the following equations. This corresponds to (4) in FIG. 5.

$$\eta(i,j)=\eta(j,j)-(Pj-Pi)(\eta(j,j)-\eta(j+1,j))/(Pj-Pj+1), \text{ and}$$

$$\eta(i,j+1)=\eta(j,j+1)-(Pj-Pi)(\eta(j,j+1)-\eta(j+1,j+1))/(Pj-Pj+1).$$

Next, in step S4, using the calculated pump efficiencies η(i,j) and η(i,j+1), the pump efficiency ηo is calculated by the following equation. This corresponds to (5) in FIG. 5.

$$\eta o=\eta(,j)-(Kj-Ki)(\eta(i,j)-\eta(i,j+1))/(Kj-Kj+1).$$

By the above-described operations, the pump efficiency ηo at the time when the pump discharge pressure is Pi and the pump swash plate angle is Ki may be determined with good accuracy. That is, the pump efficiency may be calculated with good efficiency by determining the pump efficiency using the pump discharge pressure and the pump swash plate angle as parameters.

As illustrated in FIG. 4, the hydraulic pump output (on the shaft input side) Win may be estimated and determined with good accuracy by dividing the hydraulic pump output (on the shaft output side) Wout determined by operations by the pump efficiency ηo determined by the above-described operations. The hydraulic pump output (on the shaft input side) Win thus calculated by estimation operations corresponds to the power input to the hydraulic pump 21. The power input to the hydraulic pump 21 is the sum of the output of the engine 30 and the output of the assist motor 34. Therefore, the output of the engine 30 (that is, the load of the engine 30) may be controlled with good accuracy by controlling the output of the assist motor 34 so that the sum of the output of the engine 30 and the output of the assist motor 34 equals the determined hydraulic pump output (on the shaft input side) Win. Accordingly, it is possible to perform control so that the load on the engine 30 is always proper, so that it is possible to drive the engine 30 with efficiency.

In the above-described hydraulic load estimation algorithm, no negative control pressure (nega-con pressure Nc) is taken into consideration. By taking the nega-con pressure Nc into consideration, it is possible to determine the hydraulic pump output (on the shaft input side) Win with higher accuracy.

Figure 7:
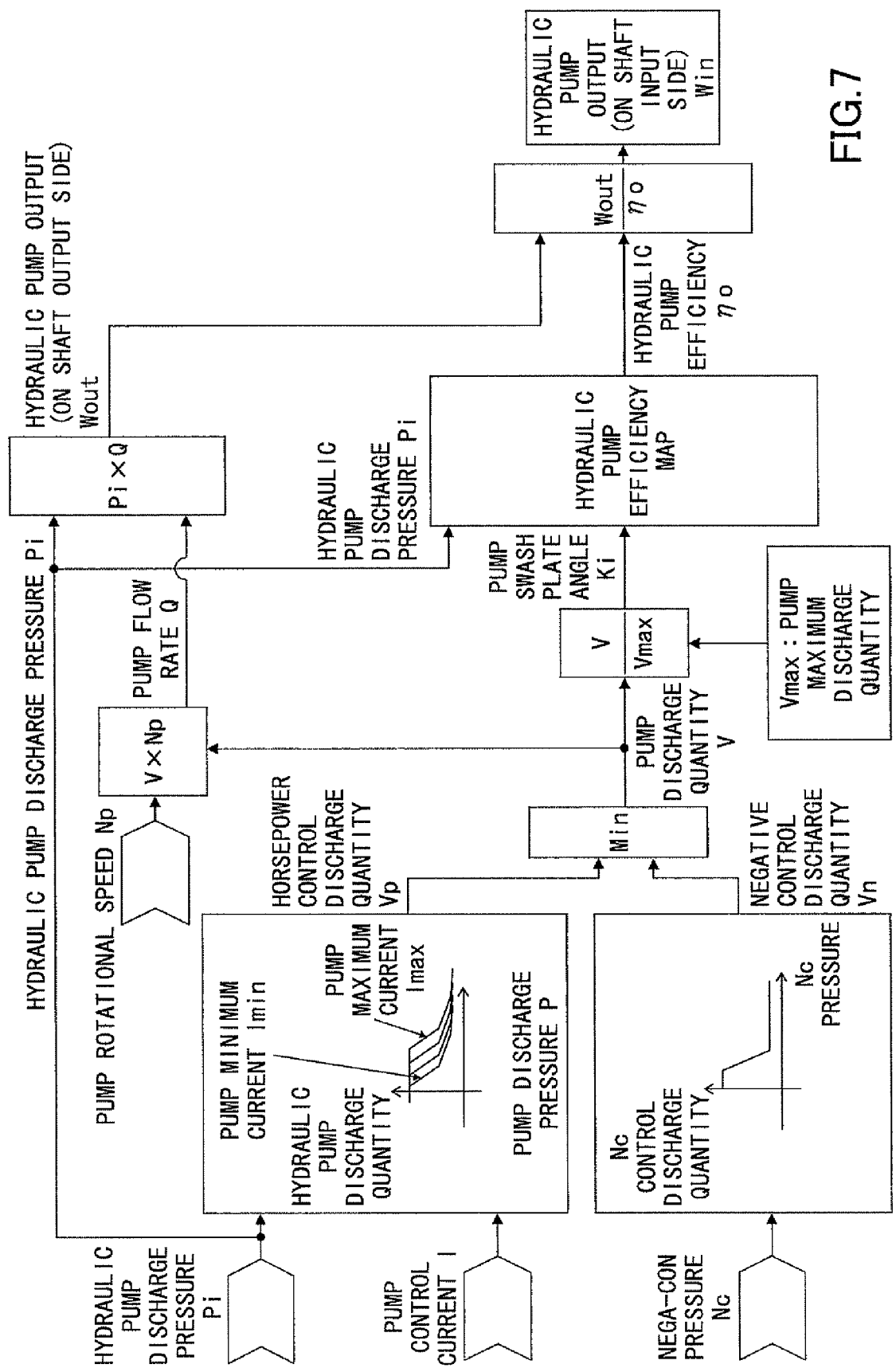
FIG. 7 is a diagram illustrating a hydraulic load calculation algorithm in the case of considering a nega-con pressure.

FIG. 7 is a diagram illustrating a hydraulic load calculation algorithm used in calculating the shaft input side output (power) Win in consideration of the nega-con pressure Nc. In the case of considering the nega-con pressure Nc, the hydraulic load estimation algorithm is the same as that illustrated in FIG. 4 except for the process up to the determination of the pump discharge quantity V. Therefore, a description is given of the process up to the determination of the pump discharge quantity V.

In determining the pump discharge quantity V, a horsepower control discharge quantity Vp is determined from the hydraulic pump discharge pressure Pi and the pump control current I using a P-Q diagram, and at the same time, a negative control discharge quantity Vn is determined from the nega-con pressure Nc. In the hydraulic load estimation algorithm illustrated in FIG. 4, the horsepower control discharge quantity Vp is directly determined as the pump discharge quantity V.

In the P-Q diagram illustrated in FIG. 7, the horizontal axis represents the discharge pressure P and the vertical axis represents the horsepower control discharge quantity Vp. The discharge pressure P and the horsepower control discharge quantity Vp of the hydraulic pump 21 are inversely proportional to each other, and the P-Q diagram varies depending on the pump control current I. In this P-Q diagram, if the pump control current I and the discharge pressure P are determined, it is possible to determine the horsepower control discharge quantity Vp.

The negative control discharge quantity Vn may be determined from the negative control pressure (nega-con pressure) Nc based on a negative control pressure-discharge quantity characteristic diagram. The negative control discharge quantity Vn may be determined by inputting a nega-con pressure to the nega-con pressure-discharge quantity characteristic diagram illustrated in FIG. 7.

The pump discharge quantity V is the smaller of the above-described horsepower control discharge quantity Vp and negative control discharge quantity Vn. It is possible to calculate the hydraulic pump output (on the shaft input side) Win with higher accuracy by using the thus determined pump discharge quantity V for the calculation of the hydraulic pump output (on the shaft output side) Wout and the calculation of the hydraulic pump efficiency ηo.

In the above-described hydraulic load estimation algorithms, the hydraulic pump output (on the shaft input side) Win is calculated from the hydraulic pump output (the shaft output) Wout using the hydraulic pump efficiency. Alternatively, the hydraulic pump output (on the shaft input side) Win may be calculated directly from a drive torque T of the hydraulic pump 21 and the rpm Np of the hydraulic pump 21.

Figure 8:
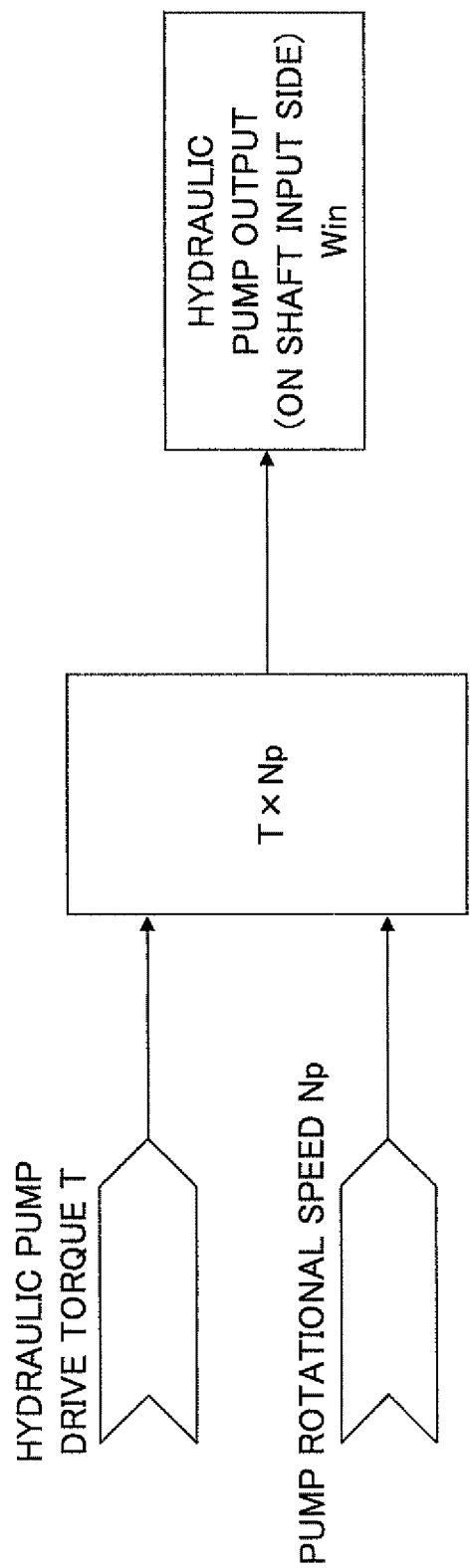
FIG. 8 is a diagram illustrating a hydraulic load estimation algorithm to calculate a hydraulic pump output (on the shaft input side) directly from the drive torque and rpm of the hydraulic pump.

FIG. 8 is a diagram illustrating a hydraulic load estimation algorithm to calculate the hydraulic pump output (on the shaft input side) Win directly from the drive torque T of the hydraulic pump 21 and the rpm Np of the hydraulic pump 21.

The drive torque T of the hydraulic pump 21 may be measured by providing the drive shaft of the hydraulic pump 21 with a torque sensor. Alternatively, the drive torque T of the hydraulic pump 21 may be measured by providing the output shaft of the splitter 32 with a torque sensor. That is, a connecting shaft that supplies the hydraulic pump 21 with the power of the engine 30 is provided with a torque sensor, and the input side power of the hydraulic pump 21 is calculated from the detection value of the torque sensor.

The rotational speed (rpm) Np of the hydraulic pump 21 may be measured by providing the output shaft of the hydraulic pump 21 with an encoder or the like. The hydraulic pump output (on the shaft input side) Win may be calculated by multiplying the drive torque T of the hydraulic pump 21 by the rotational speed Np.

It is possible to cause the load of the engine 30 to be always proper by controlling the amount of assisting of the assist motor 34 by calculating the hydraulic pump output (on the shaft input side) Win with good accuracy using the above-described hydraulic load estimation algorithm illustrated in FIG. 4, FIG. 7, or FIG. 8. Accordingly, the engine 30 is prevented from being overloaded, so that it is possible to drive the engine 30 always under efficient conditions.

That is, the output of the assist motor 34 (whose values are positive in the electrically driven state) is controlled to be equal to the difference between the output (on the shaft input side) Win of the variable displacement hydraulic pump 21 and the output We of the engine 30 (Wa=Win−We). Further, if the output Win of the hydraulic pump 21 becomes greater than the sum of the output We of the engine 30 and the output Wa of the assist motor 34 (Win>We+Wa), the engine 30 is overloaded. Therefore, a maximum output Wamax of the assist motor 34 is controlled to be greater than the difference between the output Win of the variable displacement hydraulic pump 21 and a maximum output Wemax of the engine 30 (Wamax>Win−Wemax). Here, considering a maximum output Wbmax of the battery 38 in the case where there is the output request Wout of an electrical load, the maximum output Wamax of the assist motor 34 in the electrically driven state is limited to be smaller than the difference between the maximum output Wbmax of the battery 38 and the output request Wout of the electrical load (Wamax<Wbmax−Wout).

In the above description, the driving of the hydraulic pump 21 is controlled based on negative control, while there are methods of controlling the driving of the hydraulic pump 21 other than the negative control, which are positive control and load sensing control.

Figure 9:
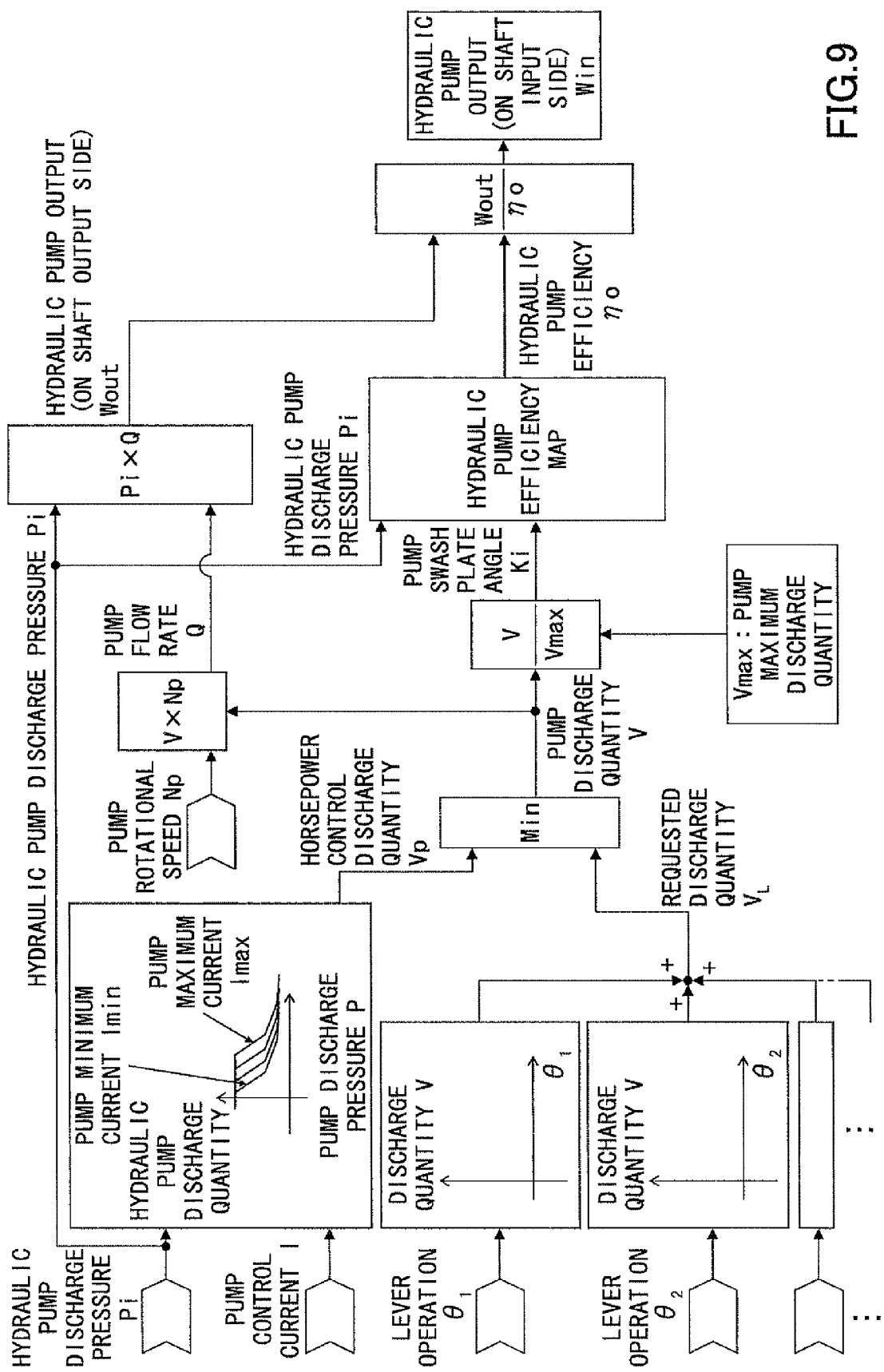
FIG. 9 is a diagram illustrating a hydraulic load estimation algorithm used in calculating the shaft input side output (power) in the case where the pump control circuit is configured to perform positive control.

First, a description is given of the case of controlling the driving of the hydraulic pump 21 based on positive control. FIG. 9 is a diagram illustrating a hydraulic load estimation algorithm used in calculating the shaft input side output (power) Win in the case where the pump control circuit is configured to perform positive control. In the case of performing positive control, the hydraulic load estimation algorithm is the same as that in the case of performing negative control illustrated in FIG. 7 except for the process up to the determination of the pump discharge quantity V. Accordingly, a description is given of the process up to the determination of the pump discharge quantity V.

In the case of performing positive control, from the amounts of lever operation $\theta_1$, $\theta_2$, . . . of operating levers operated by an operator to drive hydraulically driven parts, the quantities of discharge $V_{L1}$, $V_{L2}$, . . . required of the hydraulic pump 21 according to the amounts of operation of the respective operating levers are determined based on a map showing the relationship between the amounts of lever operation $\theta_1$, $\theta_2$, . . . and the quantities of discharge $V_{L1}$, $V_{L2}$, . . . . Then, the sum of all of the quantities of discharge $V_{L1}$, $V_{L2}$, . . . is determined as a required quantity of discharge $V_L$ required of the hydraulic pump 21.

Then, the pump discharge quantity V is the smaller of the horsepower control discharge quantity Vp and the required quantity of discharge $V_L$. It is possible to calculate the hydraulic pump output (on the shaft input side) Win using the algorithm illustrated in FIG. 7 by using the thus determined pump discharge quantity V for the calculation of the hydraulic pump output (on the shaft output side) Wout and the calculation of the hydraulic pump efficiency ηo.

Figure 10:
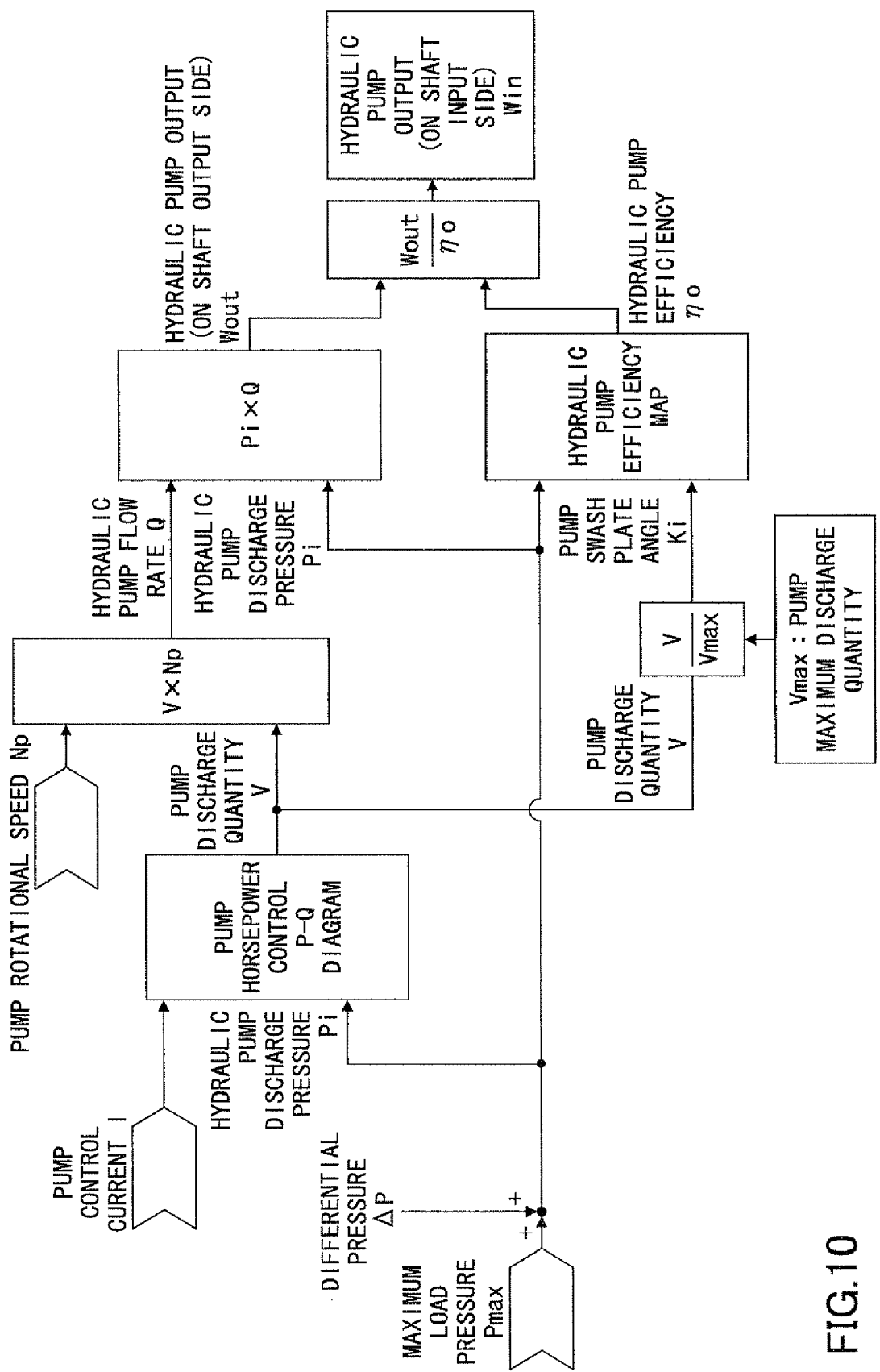
FIG. 10 is a diagram illustrating a hydraulic load calculation algorithm used in calculating the shaft input side output (power) in the case where the pump control circuit is configured to perform load sensing control.

Next, a description is given of the case of controlling the driving of the hydraulic pump 21 by load sensing control. FIG. 10 is a diagram illustrating a hydraulic load calculation algorithm used in calculating the shaft input side output (power) Win in the case where the pump control circuit is configured to perform load sensing control. In the case of performing load sensing control, the hydraulic load calculation algorithm is the same as the hydraulic load estimation algorithm illustrated in FIG. 4 except for the process up to the determination of the pump discharge quantity V. Accordingly, a description is given of the process up to the determination of the pump discharge quantity V.

In the case of performing load sensing control, the hydraulic pump discharge pressure Pi in FIG. 4 is a value obtained by adding a differential pressure ΔP to a maximum load pressure Pmax. The differential pressure ΔP, which is added in order to allow some margin for the pump discharge quantity, may be either a fixed value or a variable value. Then, the pump discharge quantity V is determined from the hydraulic pump discharge pressure Pi determined as described above and the control current I supplied to the hydraulic pump 21 based on a P-Q diagram showing the discharge pressure-discharge quantity characteristic of the hydraulic pump 21. It is possible to calculate the hydraulic pump output (on the shaft input side) Win using the algorithm illustrated in FIG. 10 by using the thus determined pump discharge quantity V for the calculation of the hydraulic pump output (on the shaft output side) Wout and the calculation of the hydraulic pump efficiency ηo.

Next, a description is given, with reference to drawings, of another embodiment of the present invention. In this embodiment, a description is given, assuming that the output control method according to the present invention is applied to the hydraulic shovel illustrated in FIG. 1. The hybrid working machine to which the present invention is applied is not limited to the hydraulic shovel.

In such a hybrid system as illustrated in FIG. 3, when the engine 30 is overloaded because of an increase in the hydraulic load, it is necessary to reduce the output required of the engine 30 by the hydraulic pump (that is, a load on the engine 30) by controlling the output of the hydraulic pump 21. The output of the hydraulic pump 21, which is a variable displacement hydraulic pump, may be controlled by controlling a control current supplied to the hydraulic pump 21.

As described above, when the engine 30 is overloaded, it is possible to reduce a load on the engine 30 by decreasing the output of the hydraulic pump 21 by controlling the control current. Here, in the case of decreasing the output of the hydraulic pump 21, it is necessary to prevent the output from being excessively decreased in order to satisfy the request of the hydraulic load as much as possible, so that it is necessary to control the actual output of the splitter 32 (corresponding to the sum of the output of the engine 30 and the output of the assist motor 34) with good accuracy. The actual output of the splitter 32 is directly input to the hydraulic pump 21. Therefore, assuming that the pump efficiency of the hydraulic pump 21 is constant, the actual output of the splitter 32 may be regarded as corresponding to the output of the hydraulic pump 21.

Therefore, letting the current output of the splitter 32 be a current output Wi of the hydraulic pump 21, the engine 30 is overloaded if the current output Wi of the hydraulic pump 21 becomes greater than the sum of the output We of the engine 30 and the output Wa of the assist motor 34 (Wi>We+Wa). An excess ΔWr of the current output Wi of the hydraulic pump 21 is determined as Wi−(We+Wa). Here, the engine output We may be determined from the rpm and the torque of the engine 30 or from the amount of injected fuel of the engine 30. Further, the assist motor output Wa may be determined from the rpm and the torque of the assist motor 34.

Accordingly, if the excess ΔWr of the current output Wi of the hydraulic pump 21 is a positive value (ΔWr>0), it is determined that the engine 30 is overloaded, so that the output of the hydraulic pump 21 is controlled. The reduction of the output of the hydraulic pump 21 is equal to the excessive output ΔWr. That is, the excessive output ΔWr corresponds to the pump output reduction, and the target value of the pump output reduction is the excessive output ΔWr.

The output of the hydraulic pump 21 may be controlled with the supplied control current (hereinafter referred to as "pump current I"). Therefore, the pump current I may be varied (reduced) by the amount corresponding to the above-described excessive output ΔWr. Accordingly, a reduced pump current Io may be determined by determining the pump current reduction ΔI of the hydraulic pump 21 from the pump output reduction ΔWr and subtracting the pump current reduction ΔI from the current pump current I. By using the algorithm as described above, it is possible to determine the reduced pump current Io from the pump output reduction ΔWr with good accuracy.

Here, the reduced pump current Io may be calculated with the following methods:

1) a calculation method based on linear interpolation the controlled pump current Io is calculated by linear interpolation based on the relationship between ΔW and ΔI using the pump output reduction ΔWr:

$$\Delta Io = f(\Delta Wr) \rightarrow Io,$$

2) a calculation method based on a pump torque map (P-T map)

the controlled pump current Io is calculated from the relationship between the pump output reduction ΔWr and a pump torque reduction ΔTr:

$$\Delta Tr = f(\Delta Wr) \rightarrow \Delta Io = f(\Delta Wr) \rightarrow Io, \text{ and}$$

3) a calculation method based on a pump discharge quantity map (P-Q map)

the controlled pump current Io is calculated from the relationship between the pump output reduction ΔWr and a pump discharge quantity ΔQr:

$$\Delta Qr = f(\Delta Wr) \rightarrow \Delta Io = f(\Delta Qr) \rightarrow Io.$$

Figure 11:
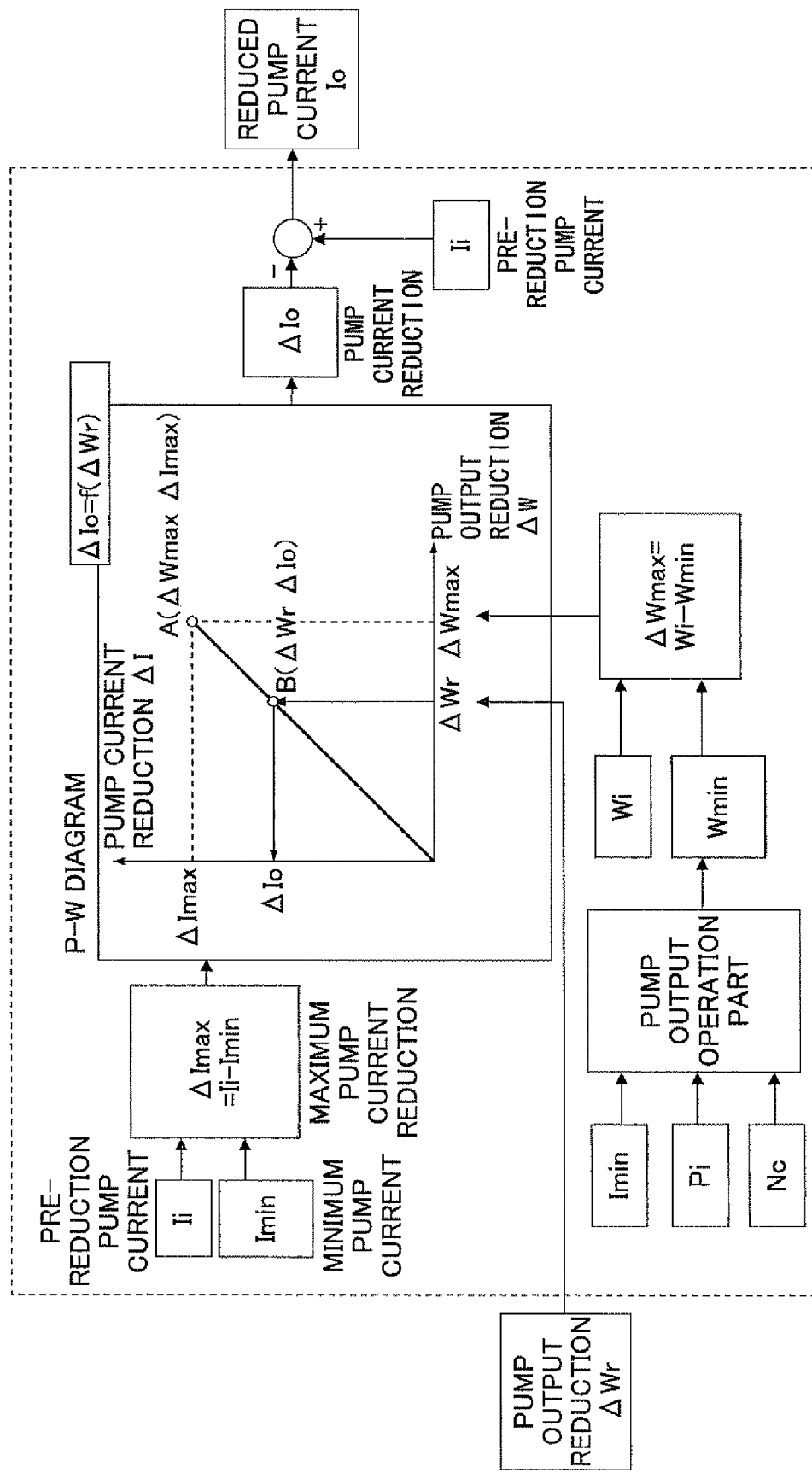
FIG. 11 is a diagram for illustrating a method for calculating a pump current reduction by linear interpolation.

Next, a description is given in detail of 1) the calculation method based on linear interpolation. FIG. 11 is a diagram for illustrating an algorithm for calculating a pump current reduction by linear interpolation.

First, a diagram (P-W diagram) is determined that illustrates the relationship between the pump output reduction ΔW and the pump current reduction ΔI:

$$(\Delta Io = f(\Delta Wr)).$$

A maximum pump current reduction ΔImax is determined by subtracting a minimum pump current (fixed value) Imin from a pre-reduction pump current Ii (ΔImax=Ii−Imin). ΔImax is a value that indicates how much the current pump current Ii may be reduced.

Figure 12:
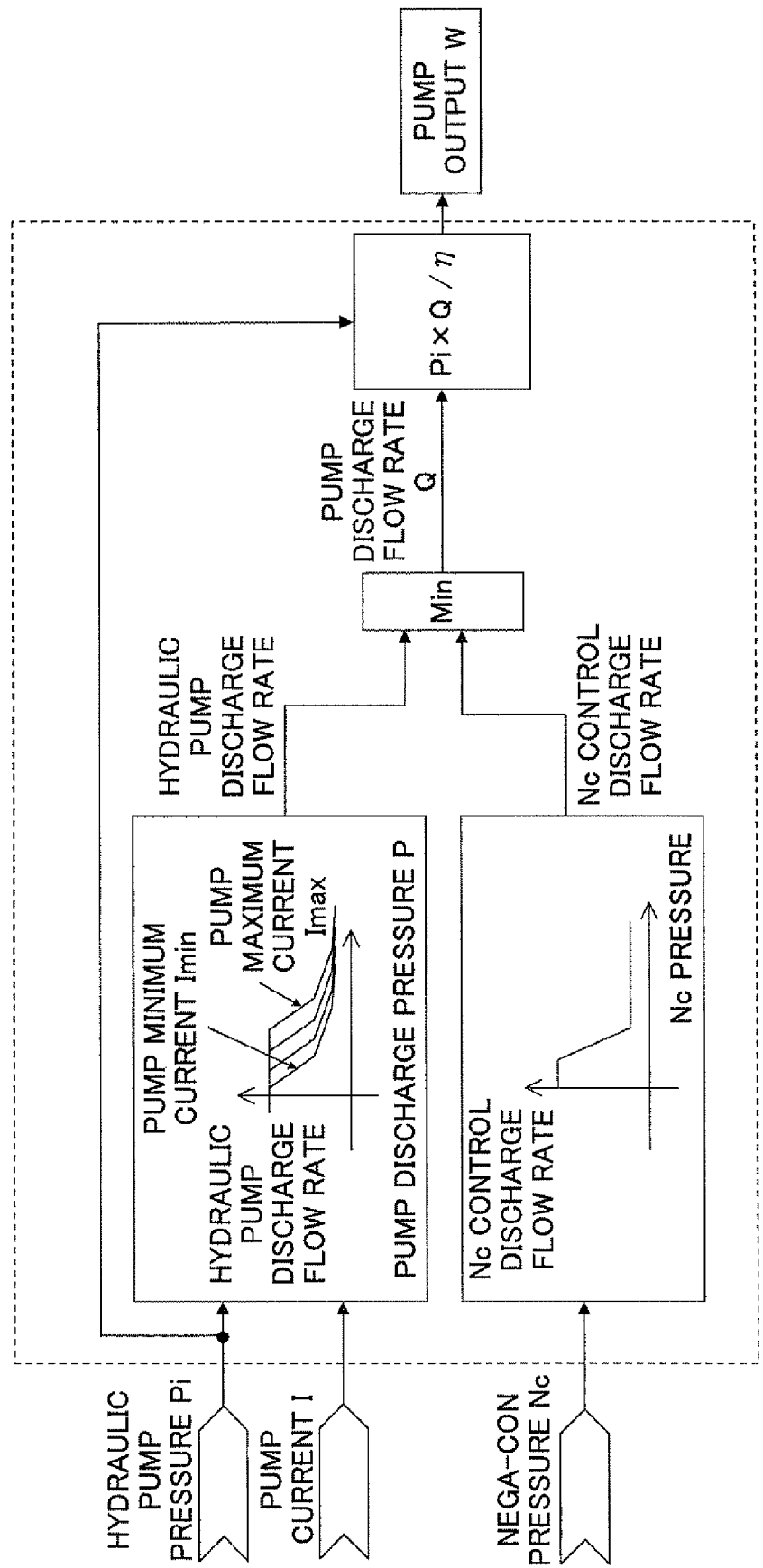
FIG. 12 is a block diagram of a pump output operation part illustrated in FIG. 11.

Next, a pump minimum output Wmin is determined by an operation from the minimum pump current Imin, the pump discharge pressure Pi, and the nega-con pressure Nc. This operation is performed by a pump output operation part. FIG. 12 is a functional configuration diagram of the pump output operation part. The pump output operation part is configured to compute the pump output W with respect to the pump current I. The hydraulic pump pressure Pi and the nega-con pressure Nc as well as the pump current I are input to the pump output operation part.

The pump output operation part includes a map that shows the relationship between the pump discharge pressure P and the hydraulic pump discharge flow rate at each of pump currents between the minimum pump current Imin and a maximum pump current Imax (a P-Q diagram showing the discharge pressure-discharge quantity characteristic of the hydraulic pump 21), and determines the hydraulic pump discharge quantity from the input pump current I and hydraulic pump pressure Pi. Further, the pump output operation part includes a map that shows the relationship between the nega-con pressure Nc and the negative control discharge flow rate (a negative control pressure-discharge quantity characteristic diagram), and determines the negative control discharge flow rate from the input nega-con pressure Nc. Then, the pump output operation part determines the smaller of the determined hydraulic pump discharge flow rate and negative control discharge flow rate as the pump discharge flow rate Q. The pump output operation part multiplies the determined pump discharge flow rate Q by the hydraulic pump pressure Pi, and divides the product by the pump efficiency η, thereby calculating and outputting the pump output W.

In this embodiment, a description is given of the case of performing negative control. However, the pump output control method according to this embodiment may also be applied to the case of performing positive control as illustrated in FIG. 9 or the case of performing load sensing control as illustrated in FIG. 10.

By inputting the minimum pump current Imin, the pump discharge pressure Pi, and the nega-con pressure Nc to the pump output operation part configured to perform the above-described operation, it is possible to determine the pump minimum output Wmin. Then, as illustrated in FIG. 11, a maximum output reduction ΔWmax is determined by subtracting the pump minimum output Wmin from the pre-reduction pump output Wi (ΔWmax=Wi−Wmin).

Further, the current output Wi of the hydraulic pump 21 is also calculated using the above-described pump output operation part. In this case, the current pump current value Ii is input to a P-Q diagram showing the discharge pressure-discharge quantity characteristic of the hydraulic pump 21, and the current hydraulic pump discharge quantity is determined, so that the current pump output Wi is calculated. Thus, the excessive output ΔWr is determined using the current pump output Wi calculated in the pump output operation part based on the current pump current value Ii.

In the P-W diagram in FIG. 11, a straight line connecting Point A determined by the thus determined maximum pump current reduction ΔImax and maximum output reduction ΔWmax and the origin is determined as the P-W diagram as what shows the relationship between the pump current reduction ΔI and the pump output reduction ΔWr. Accordingly, by entering the pump output reduction ΔWr as a target value in this P-W diagram, the pump current reduction ΔIo is determined via Point κ on the straight line. That is, the pump current reduction ΔIo may be determined by the following operation:

$$\Delta Io = \Delta Imax - (\Delta Imax/\Delta Wmax) \times (\Delta Wmax - \Delta Wr).$$

Then, the reduced pump current Io may be determined by adding the thus determined pump current reduction ΔIo to the pre-reduction pump current Ii (Io=Ii+ΔIo).

By controlling the output of the hydraulic pump 21 by supplying the hydraulic pump 21 with the thus determined pump current (control current) To and varying the tilting angle of the swash plate 21a based on the pump current (control current) Io, it is possible to reduce the output of the hydraulic pump 21 by the excess ΔWr of the current output Wi, so that it is possible to moderately reduce the overload on the engine 30. Further, by inputting the thus determined pump current (control current) Io to the pump output operation part illustrated in FIG. 4 and FIG. 12 as the pump current I, it is possible to determine the hydraulic pump input side output based on the reduced pump current (control current) Io. Thereby, it is possible to calculate a precise amount of assisting of the assist motor 34. Accordingly, it is possible to prevent the battery 38, which is a charge storage device, from being excessively discharged, so that it is possible to perform a long-time operation.

Figure 13:
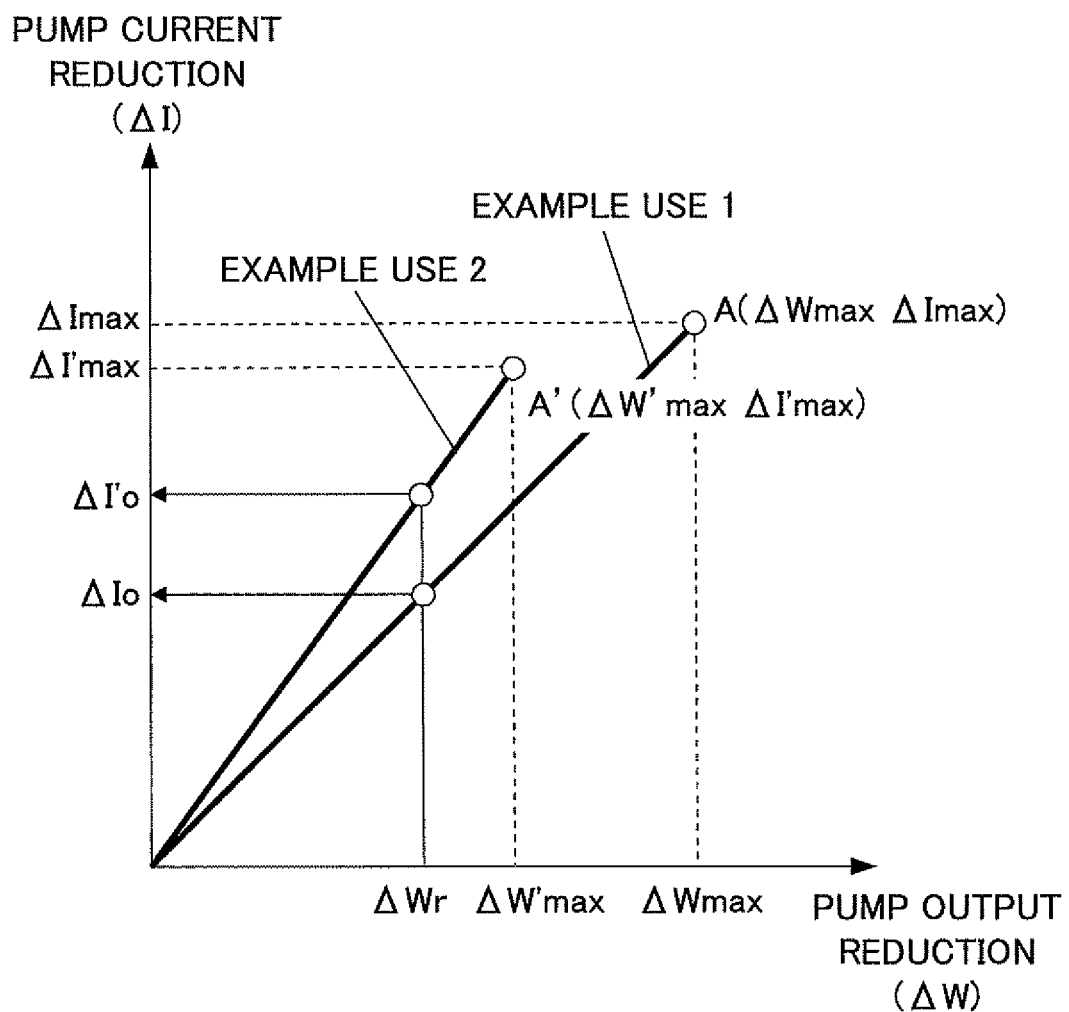
FIG. 13 is a diagram for illustrating a P-W diagram illustrated in FIG. 11.

The P-W diagram in FIG. 11 is determined based on the maximum pump current reduction ΔImax (how much the current may be reduced) and the maximum output reduction ΔWmax (a value in consideration of the nega-con pressure Nc) as illustrated in FIG. 13. In FIG. 13, the slope of the P-W line differs between Example Use 1 and Example Use 2, thus showing that the pump current reduction ΔIo to be determined also differs. Accordingly, by using the above-described calculation method based on linear interpolation, it is possible to control the output of the hydraulic pump 21 in consideration of the current value of the pump current I and the effect of the nega-con pressure Nc.

Next, a description is given in detail of 2) the calculation method based on a pump torque map (P-T map). According to this calculation method, a pump torque map (P-T map) is prepared that maps a pump torque T determined from the pump discharge pressure P and the pump current I, and the reduced pump current Io is calculated using the P-T map.

Figure 14:
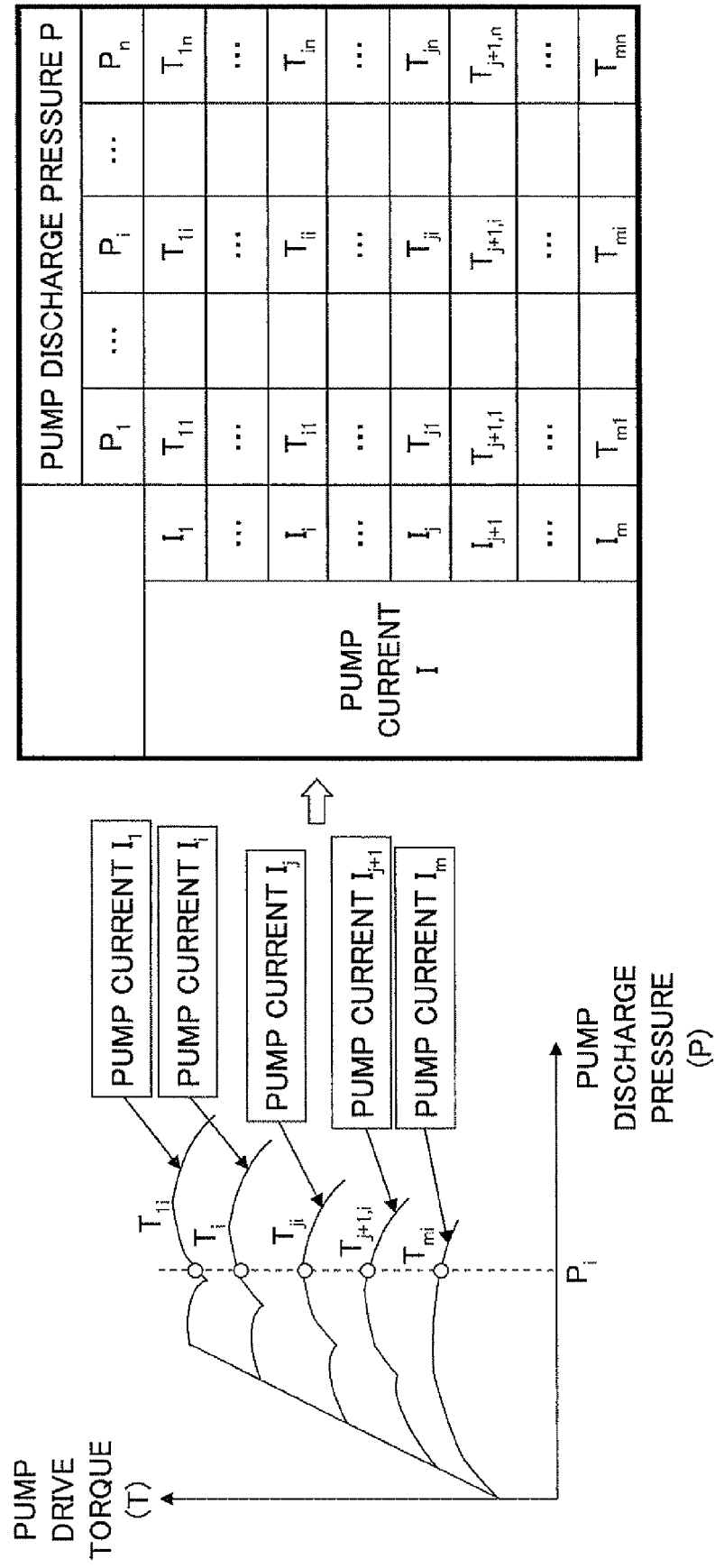
FIG. 14 is a diagram illustrating creation of a P-T map table from a diagram showing the relationship between a pump discharge pressure and a pump drive torque determined by a pump current.

FIG. 14 is a diagram illustrating creation of a P-T map table from a diagram showing the relationship between the pump discharge pressure P and the pump drive torque T determined by the pump current I. With the pump current I being constant, the pump drive torque T for obtaining the pump discharge pressure P is determined. The diagram illustrated in FIG. 14 shows the relationship between the pump discharge pressure P and the pump drive torque T determined by each pump current with the pump current varying from $I_1$ to $I_m$. A P-T map table is created from this relationship of the diagram. The table shows pump drive toques T necessary to obtain pump discharge pressures $P_1$ through $P_n$ at the pump currents $I_1$ through $I_m$, respectively. For example, it is understood from the P-T map table that in order to obtain a pump discharge pressure $P_i$ when the pump current is set to $I_j$, the pump drive torque may be $T_{ji}$ indicated at the intersection of the row of $I_j$ and the column of $P_i$.

Figure 15:
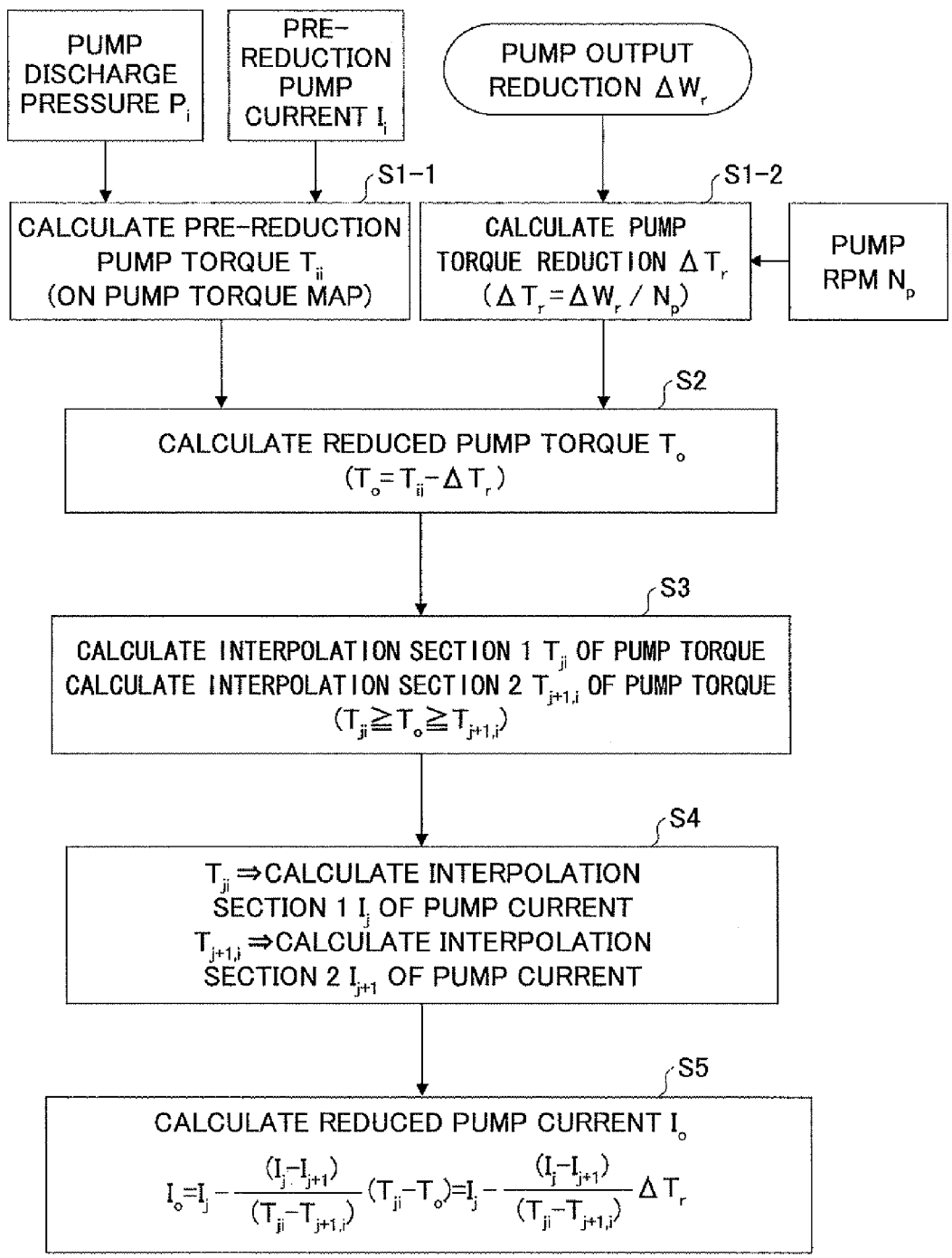
FIG. 15 is a flowchart of a process for obtaining the reduced pump current from a pump output reduction using the P-T map table illustrated in FIG. 14.

FIG. 15 is a flowchart of a process for obtaining the reduced pump current Io from the pump output reduction ΔWr using the P-T map table illustrated in FIG. 14. FIG. 16 is the P-T map table, in which parts corresponding to the steps of the process of FIG. 15 are indicated.

First, in step S1-1, a pre-reduction pump torque $T_{ii}$ is determined from the pump discharge pressure $P_i$ and the pre-reduction pump current $I_i$. This corresponds to (1) of the pump torque map table illustrated in FIG. 16. At the same time, in step S1-2, the pump torque reduction ΔTr is calculated from the pump output reduction ΔWr and the pump rpm Np. The pump torque reduction ΔTr is a value obtained by dividing the pump output reduction ΔWr by the pump rpm Np (ΔTr=ΔWr/Np).

Next, in step S2, a controlled pump torque To is calculated from the pre-control pump torque $T_{ii}$ determined in step S1-1 and the pump torque reduction ΔTr calculated in step S1-2. The controlled pump torque To is a value obtained by subtracting the pump torque reduction ΔTr from the pre-control pump torque $T_{ii}$ (To=$T_{ii}$−ΔTr). It is assumed that the pump torque To obtained here is a value between the pump torque $T_{ji}$ and a pump torque $T_{j+1,i}$ as indicated by (2) of FIG. 16.

Next, in step S3, the pump torques $T_{ji}$ and $T_{j+1,i}$ above and below the pump torque To in the P-T map table are determined. In FIG. 16, the pump torques $T_{ji}$ and $T_{j+1,i}$ are indicated by (3). It is the section between the pump torque $T_{ji}$ and the pump torque $T_{j+1,i}$ that is the interpolation section of torque.

Then, in step S4, the pump current $I_j$ corresponding to the pump torque $T_{ji}$ is determined, and a pump current $I_{j+1}$ corresponding to the pump torque $T_{j+1,i}$ is determined. In FIG. 16, the pump currents $I_j$ and $I_{j+1}$ are indicated by (4). It is the section between the pump current $I_j$ and the pump current $I_{j+1}$ that is the interpolation section of current.

Next, in step S5, the reduced pump current Io is calculated by interpolation. The reduced pump current Io is calculated by the following equation:

$$Io = I_j - (I_j - I_{j+1})(T_{ji} - To)/(T_{ji} - T_{j+1,i})$$
$$= I_j - (I_j - I_{j+1})\Delta Tr/(T_{ji} - T_{j+1,i}).$$

In FIG. 16, the reduced pump current Io determined by this equation is indicated by (5).

As described above, by using the pump torque map table, it is possible to easily determine the reduced pump current Io from the pump output reduction ΔWr. It is possible to control the output of the hydraulic pump 21 by varying the tilting angle of the swash plate 21a based on this pump current Io. Further, it is possible to determine the hydraulic pump input side output based on the reduced pump current (control current) Io by inputting the reduced current Io to the pump output operation part.

Next, a description is given in detail of 3) the calculation method based on a pump discharge quantity map (P-Q map). According to this calculation method, a pump discharge quantity map (P-Q map) is prepared that maps the pump discharge quantity Q determined from the pump discharge pressure P and the pump current I, and the reduced pump current Io is calculated using the P-Q map.

Figure 17:
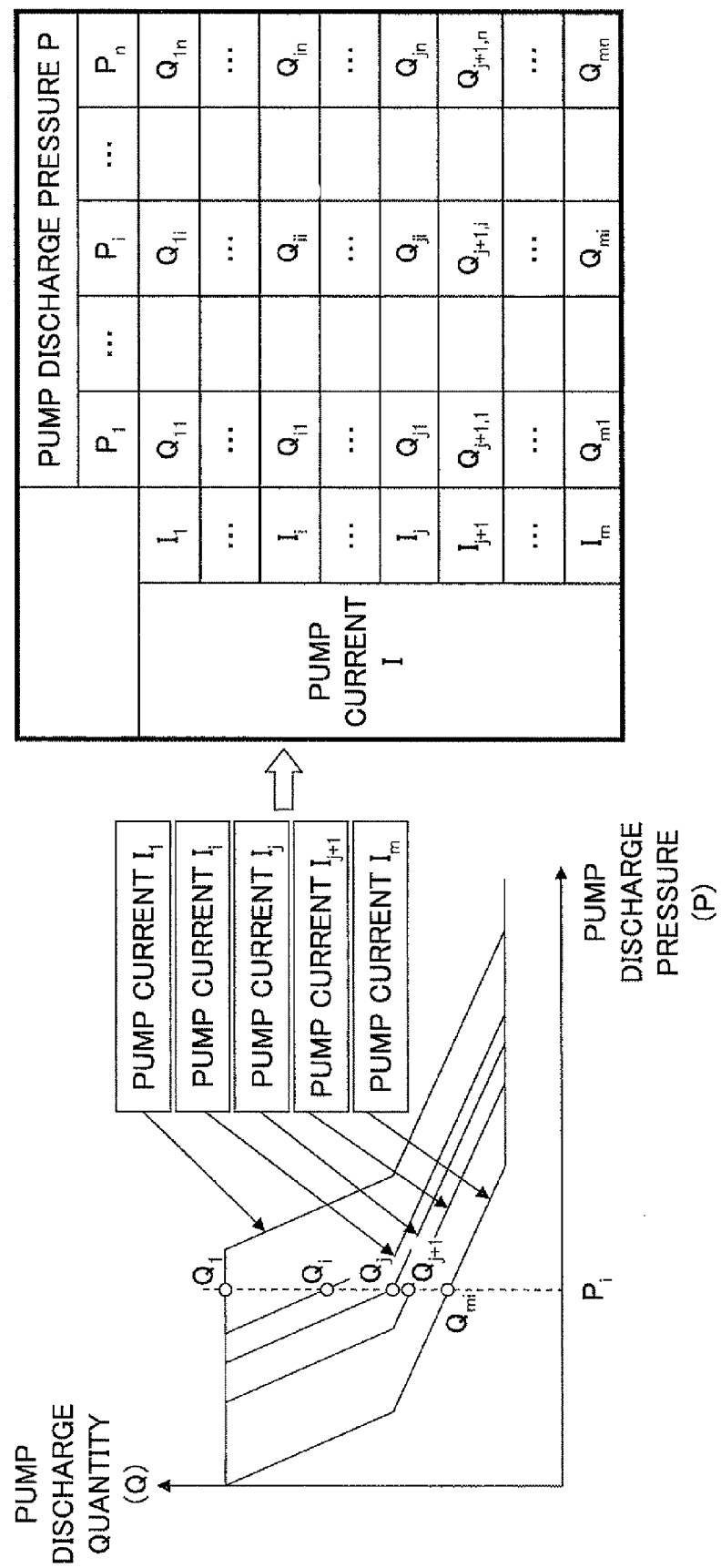
FIG. 17 is a diagram illustrating creation of a P-Q map table from a diagram showing the relationship between the pump discharge pressure and a pump discharge quantity Q determined by the pump current.

FIG. 17 is a diagram illustrating creation of a P-Q map table from a diagram showing the relationship between the pump discharge pressure P and the pump discharge quantity Q determined by the pump current I. With the pump current I being constant, the pump discharge quantity Q for obtaining the pump discharge pressure P is determined. The diagram illustrated in FIG. 17 shows the relationship between the pump discharge pressure P and the pump discharge quantity Q determined by each pump current with the pump current varying from $I_1$ to $I_m$. The P-Q map table is created from this relationship of the diagram. The table shows pump discharge quantities Q necessary to obtain pump discharge pressures $P_1$ through $P_n$ at the pump currents $I_1$ through $I_m$, respectively. For example, it is understood from the P-Q map table that in order to obtain a pump discharge pressure $P_i$ when the pump current is set to $I_j$, the pump discharge quantity may be $Q_{ji}$ indicated at the intersection of the row of $I_j$ and the column of $P_i$.

Figure 18:
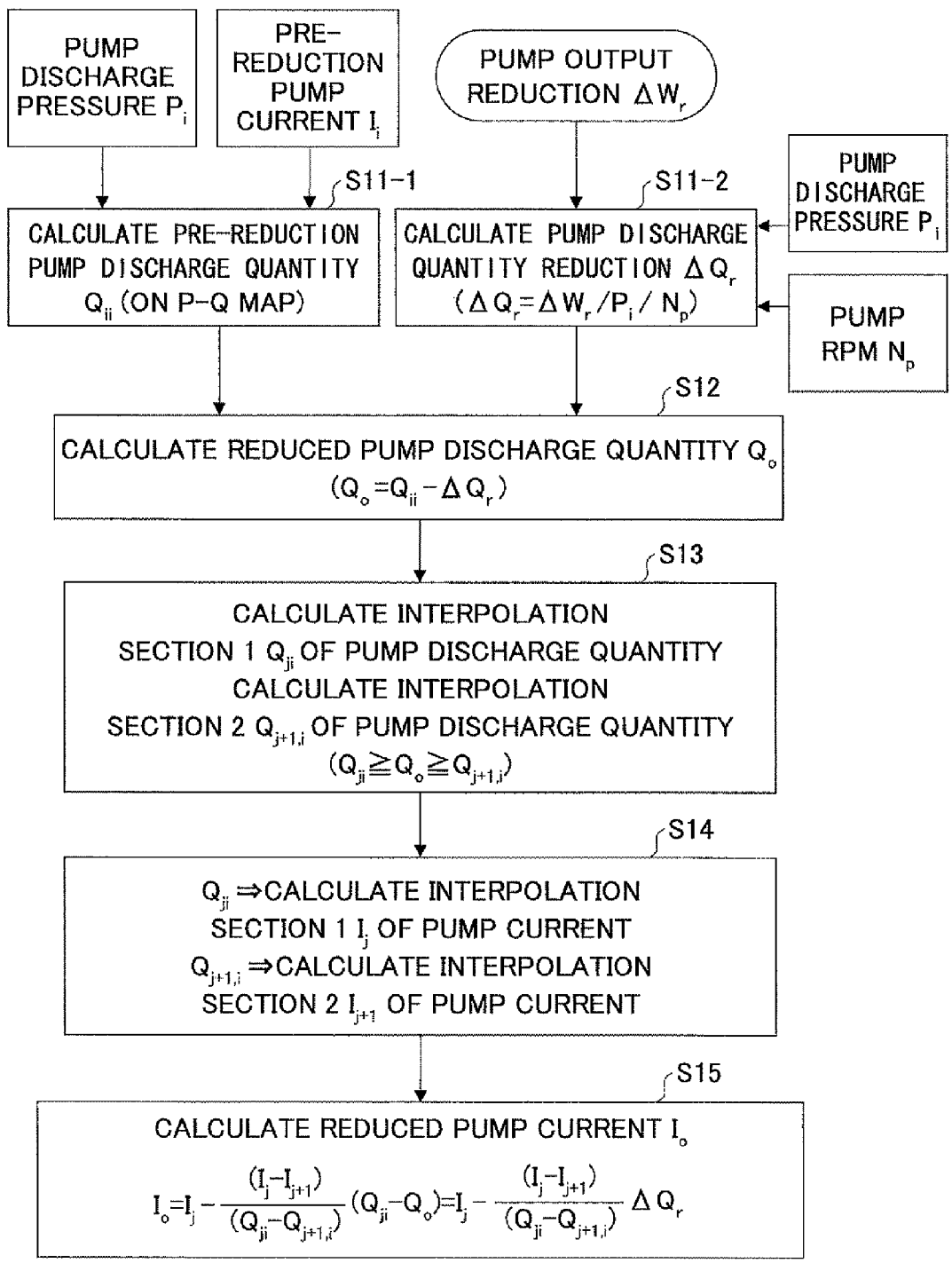
FIG. 18 is a flowchart of a process for obtaining the reduced pump current from the pump output reduction using the P-Q map table illustrated in FIG. 17.

FIG. 18 is a flowchart of a process for obtaining the reduced pump current Io from the pump output reduction ΔWr using the P-Q map table illustrated in FIG. 17. FIG. 19 is the P-Q map table, in which parts corresponding to the steps of the process of FIG. 18 are indicated.

First, in step S11-1, a pre-reduction pump discharge quantity $Q_{ii}$ is determined from the pump discharge pressure $P_i$ and the pre-reduction pump current $I_i$. This corresponds to (1) of the P-Q map table illustrated in FIG. 19. At the same time, in step S11-2, the pump discharge quantity reduction ΔQr is calculated from the pump output reduction ΔWr, the pump discharge pressure Pi, and the pump rpm Np. The pump discharge quantity reduction ΔQr is a value obtained by dividing the pump output reduction ΔWr by the pump discharge pressure $P_i$ and the pump rpm Np (ΔTr=ΔWr/$P_i$/Np).

Next, in step S12, a controlled pump discharge quantity Qo is calculated from the pre-control pump discharge quantity $Q_{ii}$ determined in step S11-1 and the pump discharge quantity reduction $\Delta Qr$ calculated in step S11-2. The controlled pump discharge quantity Qo is a value obtained by subtracting the pump discharge quantity reduction $\Delta Qr$ from the pre-control pump discharge quantity $Q_{ii}$ (Qo=$Q_{ii}$−$\Delta Qr$). It is assumed that the pump discharge quantity Qo obtained here is a value between a pump discharge quantity $Q_{ji}$ and a pump discharge quantity $Q_{j+1,i}$ as indicated by (2) of FIG. 19.

Next, in step S13, the pump discharge quantities $Q_{ji}$ and $Q_{j+1,i}$ above and below the pump discharge quantity Qo in the P-Q map table are determined. In FIG. 19, the pump discharge quantities $Q_{ji}$ and $Q_{j+1,i}$ are indicated by (3). It is between the discharge quantity $Q_{ji}$ and the pump discharge quantity $Q_{j+1,i}$ that is the interpolation section of pump discharge quantity.

Then, in step S14, the pump current $I_j$ corresponding to the pump discharge quantity $Q_{ji}$ is determined, and a pump current $I_{j+1}$ corresponding to the pump discharge quantity $Q_{j+1,i}$ is determined. In FIG. 19, the pump currents $I_j$ and $I_{j+1}$ are indicated by (4). It is the section between the pump current $I_j$ and the pump current $I_{j+1}$ that is the interpolation section of current.

Next, in step S15, the reduced pump current Io is calculated by interpolation. The reduced pump current Io is calculated by the following equation:

$$Io = I_j - (I_j - I_{j+1})(Q_{ji} - Qo)/(Q_{ji} - Q_{j+1,i})$$
$$= I_j - (I_j - I_{j+1})\Delta Qr/(Q_{ji} - Q_{j+1,i}).$$

In FIG. 19, the reduced pump current Io determined by this equation is indicated by (5).

As described above, by using the P-Q map table, it is possible to easily determine the reduced pump current Io from the pump output reduction $\Delta Wr$. It is possible to control the output of the hydraulic pump 21 by varying the tilting angle of the swash plate 21*a* based on this pump current Io. Further, it is possible to determine the hydraulic pump input side output based on the reduced pump current (control current) Io by inputting the reduced current Io to the pump output operation part.

Then, while supplying the variable displacement hydraulic pump 21 with the pump current Io determined by one of the above-described calculation methods 1), 2), and 3), the output of the assist motor 34 (whose values are positive in the electrically driven state) is controlled to be equal to the difference between an output Whyd of the variable displacement hydraulic pump 21 and the output We of the engine 30 (Wa=Whyd−We). Further, if the output Whyd of the hydraulic pump 21 becomes greater than the sum of the output We of the engine 30 and the output Wa of the assist motor 34 (Whyd>We+Wa), the engine 30 is overloaded. Therefore, by controlling the output Whyd of the hydraulic pump 21 with the pump current Io, the difference between the output Whyd of the variable displacement hydraulic pump 21 and the maximum output Wamax of the assist motor 34 is controlled to be less than the maximum output Wemax of the engine 30 (Wemax>Whyd−Wamax). Here, considering the maximum output Wbmax of the battery 38 in the case where there is the output request Wout of an electrical load, the maximum output Wamax of the assist motor 34 in the electrically driven state is limited to be smaller than the difference between the maximum output Wbmax of the battery 38 and the output request Wout of the electrical load (Wamax<Wbmax−Wout).

Here, a description is given of one of the cases of using a power distributing process for distributing power from the engine and the battery based on the hydraulic load determined based on the hydraulic load calculation algorithm using the above-described embodiment of the present invention and the above-described other embodiment of the present invention. Described below is the case where the hydraulic pump output (on the shaft input side) is determined by estimation operations using the hydraulic load calculation algorithm illustrated in FIG. 4. By controlling the amount of assisting of the assist motor 34 by calculating the hydraulic pump output (on the shaft input side) with good accuracy, it is possible to cause the load on the engine 30 to be always proper. Accordingly, the engine 30 is prevented from being overloaded, so that it is possible to drive the engine 30 always under efficient conditions. The power distributing process is executed by the controller 42.

Figure 20:
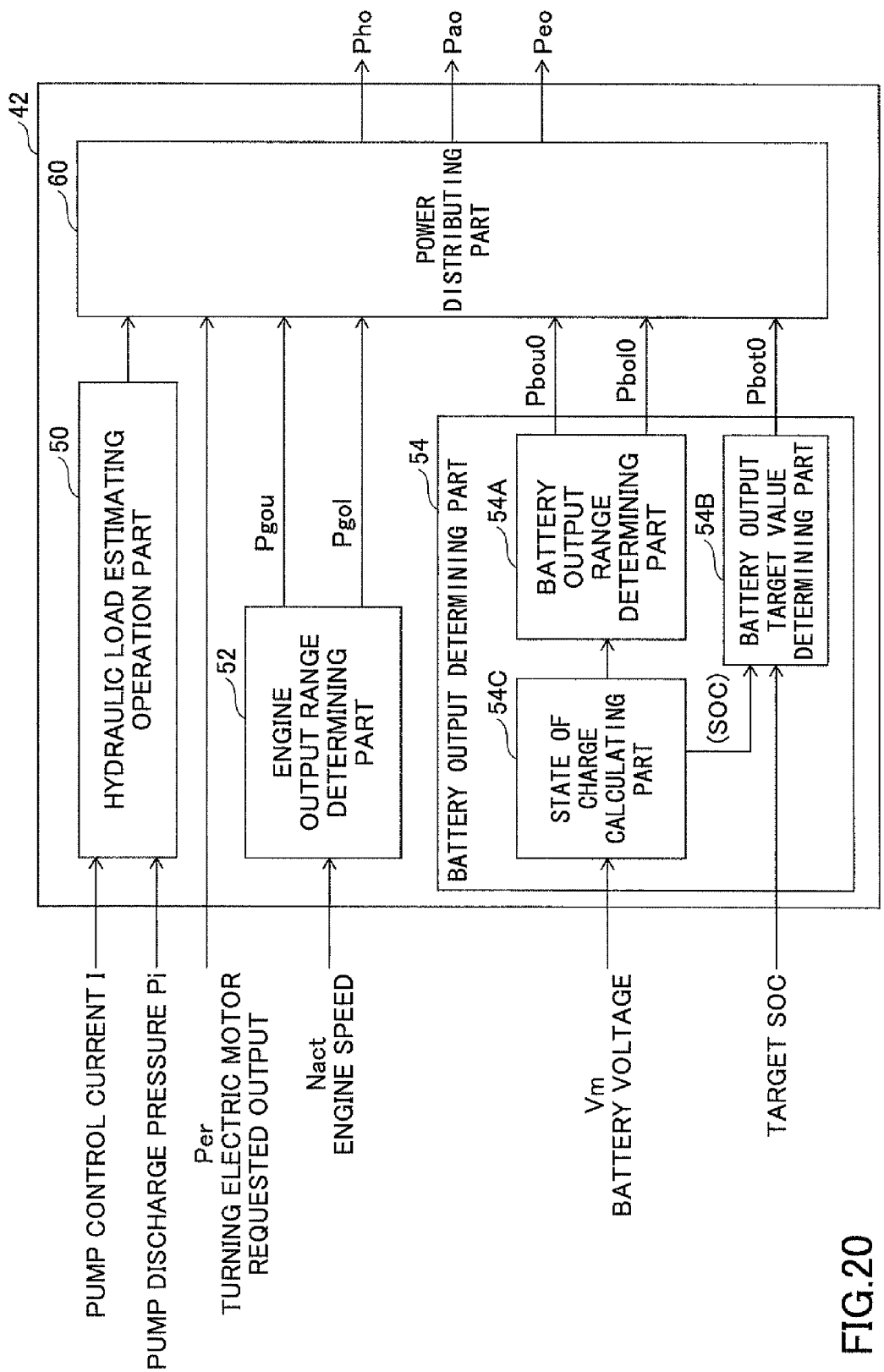
FIG. 20 is a control block diagram illustrating a power distributing process executed by the controller.

FIG. 20 is a control block diagram illustrating a power distributing process of the controller 42. The pump control current I, the pump discharge pressure Pi, a turning electric motor requested output Per, an engine speed Nact, and a battery voltage Vm are input to the controller 42.

The turning electric motor requested output Per corresponds to electric power required by an electrical load. For example, the turning electric motor requested output Per is calculated based on, for example, the amount of operation of operating levers operated by an operator.

The engine speed Nact corresponds to an actual engine speed of the engine 30. The engine 30 is constantly driven to have its engine speed Nact detected during the operation of the hydraulic shovel. The battery voltage Vm, which corresponds to the voltage across the terminals of the battery 38, is detected with a voltmeter.

The pump control current I and the pump discharge pressure Pi are input to a hydraulic load estimating operation part 50. The hydraulic load estimating operation part 50 calculates the hydraulic pump output Win as a hydraulic load based on the above-described hydraulic load calculation algorithm using the pump control current I and the pump discharge pressure Pi. The calculated hydraulic pump output Win is supplied to a power distributing part 60.

The engine speed Nact is input to an engine output range determining part 52. The engine output range determining part 52 contains a map or a conversion table for determining an engine output upper limit value and an engine output lower limit value from the engine speed Nact. The engine output range determining part 54 calculates an engine output upper limit value Pgou and an engine output lower limit value Pgol from the input engine speed Nact, and supplies the engine output upper limit value Pgou and the engine output lower limit value Pgol to the power distributing part 60.

The battery voltage Vm and a target SOC are input to a battery output determining part 54. The battery output determining part 54 includes a battery output range determining part 54A, a battery output target value determining part 54B, and a state of charge calculating part 54C. The state of charge calculating part 54C calculates a state of charge (SOC) from the input battery voltage Vm. The calculated SOC is provided to the battery output range determining part 54A and the battery output target value determining part 54B.

The battery output range determining part 54A contains a map or a conversion table for calculating a battery output upper limit value and a battery output lower limit value from the SOC. The battery output target value determining part 54B contains a map or a conversion table for calculating a battery output target value from the SOC and the target SOC. For example, this map or conversion table may define the relationship between the deviation between the input SOC and the target SOC and the battery output target value. The target SOC may be determined in a desired manner and be either a fixed value or a variable value at a normal time (that is, a normal time excluding the case where the pattern of the target SOC is generated as an internal resistance measuring pattern described below). The battery output range determining part 54A determines a first battery output upper limit value Pbou0 and a first battery output lower limit value Pbol0 from the SOC, and supplies the first battery output upper limit value Pbou0 and the first battery output lower limit value Pbol0 to the power distributing part 60. The battery output target value determining part 54B calculates a first battery output target value Pbot0 from the input SOC and the target SOC, and supplies the first battery output target value Pbot0 to the power distributing part 60.

The first battery output upper limit value Pbou0 corresponds to the upper limit value of discharge current. The first battery output lower limit value Pbol0 is negative, and its absolute value corresponds to the upper limit value of charging current. A second battery output upper limit value Pbou1 and a second battery output lower limit value Pbol1 define the appropriate range of the input/output voltage of the battery 38. For example, based on the measurement result of the internal resistance of the battery 38, Pbou1=Pbou0 and Pbol1=Pbol0 if no degradation of the battery 38 is detected, and Pbou1<Pbou0 and Pbol1>Pbol0 if degradation of the battery 38 is detected.

The power distributing part 60 determines a final hydraulic load output Pho, a final motor generator output Pao to the assist motor 34, and a final electrical load output Peo based on a hydraulic load requested output Phr, the turning electric motor requested output Per, the engine output upper limit value Pgou, the engine output lower limit value Pgol, the first battery output upper limit value Pbou0, the first battery output lower limit value Pbol0, and the first battery output target value Pbot0. At this point, the power distributing part 60 determines and output the final hydraulic load output Pho, the final motor generator output Pao to the assist motor 34, and the final electrical load output Peo so that the engine output falls within the range defined by the engine output upper limit value Pgou and the engine output lower limit value Pgol and the battery output falls within the range defined by the first battery output upper limit value Pbou0 and the first battery output lower limit value Pbol0.

The controller 42 controls the assist motor 34 based on these determined outputs.

As described above, by controlling the amount of assisting of the assist motor 34 by calculating the hydraulic pump output (on the shaft input side) Win with good accuracy using the hydraulic load estimation algorithm, it is possible to cause the load on the engine 30 to be always proper. Accordingly, the engine 30 is prevented from being overloaded, so that it is possible to drive the engine 30 always under efficient conditions.

Further, in place of the pump discharge pressure Pi, the amount of lever operation $\theta_1$ is input and the maximum load pressure Pmax and the differential pressure ΔP are input to the controller 42 in the case of positive control and load sensing, respectively. Further, in the case of performing reduction control of the hydraulic pump, the output Pao of the assist motor 34 may be determined by inputting the pump current Io determined by any of the calculation methods 1), 2), and 3) in the other embodiment of the present invention to the controller 42 in place of the pump control current I.

A description is given above of the hybrid working machines of the illustrative embodiments of the present invention. The present invention, however, is not limited to the specifically disclosed embodiments, and variations and modifications may be made without departing from the scope of CLAIMS.

The present invention is based on Japanese Patent Application No. 2008-304530, filed on Nov. 28, 2008, and Japanese Patent Application No. 2008-308698, filed on Dec. 3, 2008, the entire contents of which are incorporated herein by reference.

INDUSTRIAL APPLICABILITY

The present invention may be applied to hybrid working machines that generate a hydraulic pressure by driving a pump by assisting an internal combustion engine with an electric motor.

DESCRIPTION OF THE REFERENCE NUMERALS 1 engine motor
2 controller
3 mode selector
4 throttle volume
5 electromagnetic proportional valve
21 hydraulic pump
21a swash plate
21A pilot gear pump
22 controller valve
22a, 22b, 22c directional control valve
23 pump discharge pressure sensor
24 negative control metering valve (nega-con metering valve)
25 tank
26 negative control sensor (nega-con sensor)
27 regulator
30 engine
32 splitter
34 assist motor
36, 40 inverter
38 battery
42 controller
50 hydraulic load estimating operation part
52 engine output range determining part
54 battery output determining part
54A battery output range determining part
54B battery output target value determining part
54c state of charge calculating part

The invention claimed is:

1. A method of controlling a hybrid working machine having a hydraulic pump driven with an output of an engine and an output of a motor generator, comprising:
calculating an input side power of the hydraulic pump, and controlling the output of the motor generator based on the calculated power.

2. The method of controlling the hybrid working machine as claimed in claim 1, wherein the input side power of the hydraulic pump is calculated by an estimation operation.

3. The method of controlling the hybrid working machine as claimed in claim 2, wherein the input side power of the hydraulic pump is calculated by determining an output side power of the hydraulic pump and dividing the determined power by a pump efficiency.

4. The method of controlling the hybrid working machine as claimed in claim 3, wherein:
a variable swash plate type hydraulic pump is used as the hydraulic pump, and the pump efficiency is calculated using a swash plate angle and a discharge pressure of the variable swash plate type hydraulic pump.

5. The method of controlling the hybrid working machine as claimed in claim 1, wherein:

a connecting shaft configured to supply the hydraulic pump with a power of the engine is provided with a torque sensor, and the input side power of the hydraulic pump is calculated from a detection value of the torque sensor.

6. The method of controlling the hybrid working machine as claimed in claim 1, further comprising:

controlling an output of the hydraulic pump in accordance with a predetermined algorithm using an excess of the output of the hydraulic pump determined by subtracting the output of the engine and the output of the motor generator from the output of the hydraulic pump.

7. The method of controlling the hybrid working machine as claimed in claim 6, wherein the algorithm determines a control current of the hydraulic pump using the excess of the output and a discharge pressure of the hydraulic pump.

8. The method of controlling the hybrid working machine as claimed in claim 6, further comprising:

determining a control current of the hydraulic pump using a map created based on the algorithm.

9. The method of controlling the hybrid working machine as claimed in claim 6, wherein the algorithm determines a control current of the hydraulic pump using a diagram showing a relationship between a control current reduction and a pump output reduction of the hydraulic pump.

10. The method of controlling the hybrid working machine as claimed in claim 6, wherein the algorithm determines a control current of the hydraulic pump using a diagram showing a relationship between a control current reduction and a torque reduction of the hydraulic pump.

11. The method of controlling the hybrid working machine as claimed in claim 6, wherein the algorithm determines a control current of the hydraulic pump using a diagram showing a relationship between a control current reduction and a pump discharge quantity reduction of the hydraulic pump.

12. The method of controlling the hybrid working machine as claimed in claim 3, further comprising:

detecting a discharge pressure of the hydraulic pump;
determining a discharge quantity of the hydraulic pump; and
calculating the output side power of the hydraulic pump based on the determined discharge quantity and the detected discharge pressure.

13. The method of controlling the hybrid working machine as claimed in claim 4, further comprising:

detecting a discharge pressure of the variable swash plate type hydraulic pump;

determining a discharge quantity of the variable swash plate type hydraulic pump; and calculating the swash plate angle of the variable swash plate type hydraulic pump based on the determined discharge quantity and the detected discharge pressure.

14. The method of controlling the hybrid working machine as claimed in claim 12, further comprising:

comparing a negative control discharge quantity and a horsepower control discharge quantity and determining a smaller of the negative control discharge quantity and the horsepower control discharge quantity as the discharge quantity of the hydraulic pump, the negative control discharge quantity being the discharge quantity of the hydraulic pump determined from a negative control pressure, the horsepower control discharge quantity being the discharge quantity of the hydraulic pump determined from the discharge pressure of the hydraulic pump.

15. The method of controlling the hybrid working machine as claimed in claim 12, further comprising:

comparing a requested discharge quantity and a horsepower control discharge quantity and determining a smaller of the requested discharge quantity and the horsepower control discharge quantity as the discharge quantity of the hydraulic pump, the requested discharge quantity being determined by adding discharge quantities requested of the hydraulic pump, the discharge quantities being determined from amounts of lever operation of a plurality of operating levers configured to send commands for driving a hydraulic load, the horsepower control discharge quantity being the discharge quantity of the hydraulic pump determined from the discharge pressure of the hydraulic pump.

16. The method of controlling the hybrid working machine as claimed in claim 12, further comprising:

determining the discharge quantity of the hydraulic pump from a pump horsepower control P-Q diagram using the discharge pressure of the hydraulic pump determined by adding a predetermined differential pressure to a maximum load pressure.

\* \* \* \* \*